(12) United States Patent
Nakamura et al.

(10) Patent No.: US 10,504,011 B2
(45) Date of Patent: Dec. 10, 2019

(54) NETWORK SYSTEM, INTERFACE BOARD, METHOD OF CONTROLLING PRINTING ON AN NETWORK SYSTEM, AND PROGRAM

(71) Applicant: SEIKO EPSON CORPORATION, Tokyo (JP)

(72) Inventors: Hideo Nakamura, Shiojiri (JP); Koji Nishizawa, Shiojiri (JP); Atsushi Yamaji, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/008,986

(22) Filed: Jun. 14, 2018

(65) Prior Publication Data

US 2018/0293471 A1 Oct. 11, 2018

Related U.S. Application Data

(63) Continuation of application No. 14/958,442, filed on Dec. 3, 2015, now Pat. No. 10,026,028, which is a
(Continued)

(30) Foreign Application Priority Data

| Feb. 10, 2011 | (JP) | 2011-027533 |
| Feb. 14, 2011 | (JP) | 2011-028293 |
| Feb. 18, 2011 | (JP) | 2011-032858 |

(51) Int. Cl.
*G06F 3/12* (2006.01)
*G06K 15/02* (2006.01)
*G06K 15/00* (2006.01)

(52) U.S. Cl.
CPC ......... *G06K 15/1806* (2013.01); *G06F 3/122* (2013.01); *G06F 3/1204* (2013.01);
(Continued)

(58) Field of Classification Search
None
See application file for complete search history.

(56) References Cited

U.S. PATENT DOCUMENTS

| 6,914,694 B1 | 7/2005 | Ichikawa et al. |
| 7,065,564 B2 | 6/2006 | Machida |

(Continued)

FOREIGN PATENT DOCUMENTS

| CN | 1752918 A | 3/2006 |
| CN | 101840415 A | 9/2010 |

(Continued)

OTHER PUBLICATIONS

Hitachi, Ltd. "Screen/Form Support System, XMAP3/Web, Operation Manual", 7th Edition, 2006, pp. 15-17.

*Primary Examiner* — Dov Popovici
(74) *Attorney, Agent, or Firm* — Foley & Lardner LLP

(57) ABSTRACT

A method of controlling printing by print control script embedded in a web page acquired by a client terminal from a web application server includes, after the acquired web page is displayed, accepting an input operation on the displayed web page and drawing a result of the input operation in a specific drawing area, the accepting and drawing operations being performed by the client terminal. The method further includes generating print data by converting image data written in the specific drawing area to a form enabling processing by a printer as a result of a print operation performed on the displayed web page, and commanding the printer to print the print data.

11 Claims, 17 Drawing Sheets

Related U.S. Application Data continuation of application No. 14/600,325, filed on Jan. 20, 2015, now Pat. No. 9,235,363, which is a continuation of application No. 13/978,731, filed as application No. PCT/JP2012/053584 on Feb. 8, 2012, now Pat. No. 8,976,395.

(52) U.S. Cl.
CPC .......... *G06F 3/1222* (2013.01); *G06F 3/1228* (2013.01); *G06F 3/1289* (2013.01)

(56) References Cited

U.S. PATENT DOCUMENTS

| | | |
|---|---|---|
| 7,148,987 B2 | 12/2006 | Nishio |
| 7,196,803 B1 | 3/2007 | Simpson et al. |
| 7,606,874 B2 | 10/2009 | Machida |
| 7,725,574 B2 | 5/2010 | O'Connell et al. |
| 2003/0063307 A1 | 4/2003 | Shoji et al. |
| 2003/0137691 A1 | 7/2003 | Tanaka |
| 2003/0182378 A1 | 9/2003 | Treptow et al. |
| 2004/0054983 A1 | 3/2004 | Noguchi |
| 2004/0130747 A1 | 7/2004 | Ohishi et al. |
| 2004/0160623 A1 | 8/2004 | Strittmatter et al. |
| 2006/0061805 A1 | 3/2006 | Kawamura |
| 2006/0087680 A1 | 4/2006 | Maeda |
| 2010/0202010 A1 | 8/2010 | Xiao |
| 2010/0208298 A1 | 8/2010 | Kitagata |
| 2011/0128572 A1 | 6/2011 | Hosotsubo |

FOREIGN PATENT DOCUMENTS

| | | |
|---|---|---|
| EP | 1 450 515 A2 | 8/2004 |
| JP | 06-059829 A | 3/1994 |
| JP | 10-207661 A | 8/1998 |
| JP | 2002-007133 A | 1/2002 |
| JP | 2002-123788 A | 4/2002 |
| JP | 2002-204326 A | 7/2002 |
| JP | 2002-251270 A | 9/2002 |
| JP | 2002-251347 A | 9/2002 |
| JP | 2003-114769 A | 4/2003 |
| JP | 2004-110174 A | 4/2004 |
| JP | 2006-120041 A | 5/2006 |
| JP | 2006-134043 A | 5/2006 |
| JP | 2007-140663 A | 6/2007 |
| JP | 2008-003833 A | 1/2008 |
| JP | 2009-116890 A | 5/2009 |
| JP | 2009-230181 A | 10/2009 |

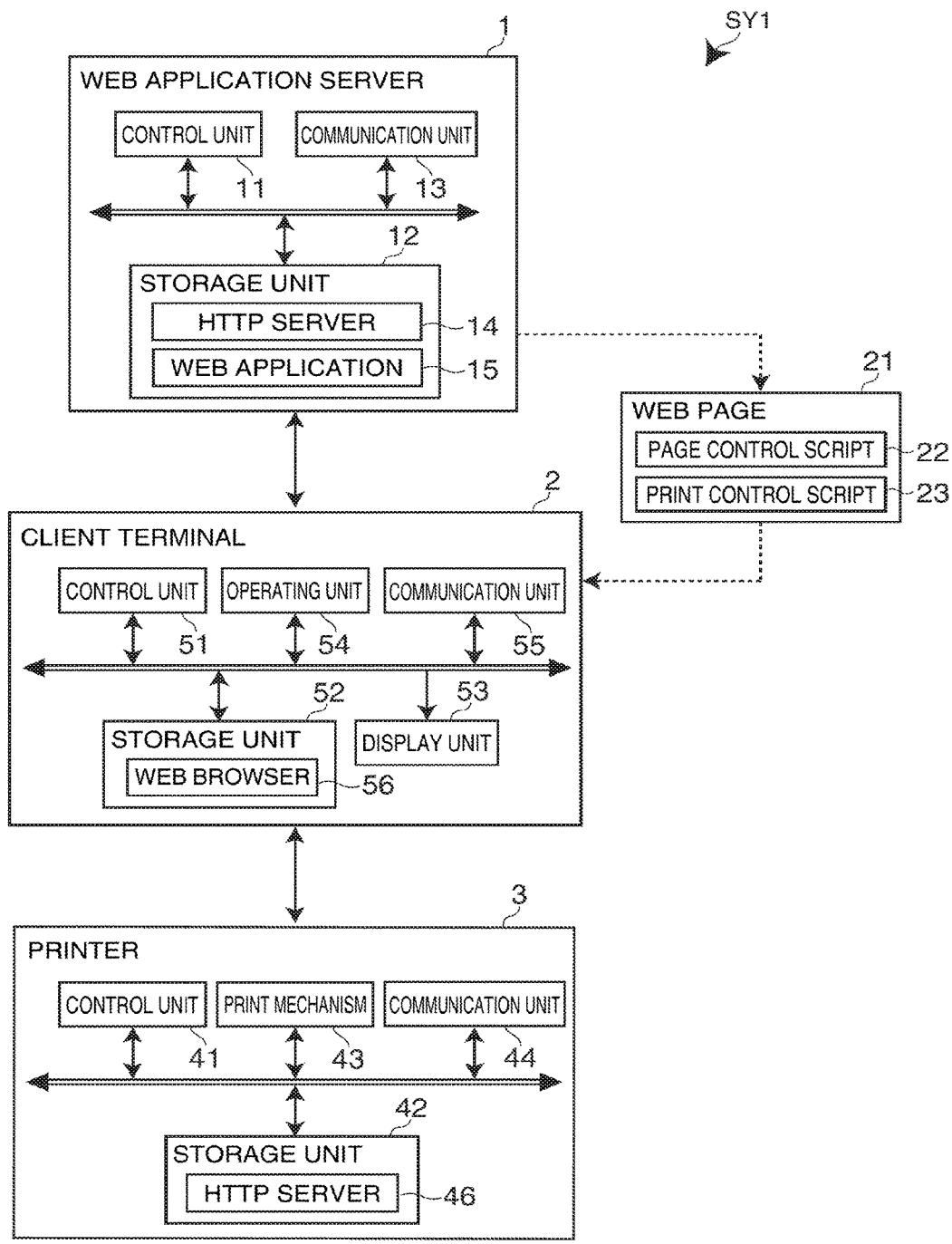

[FIG. 2]
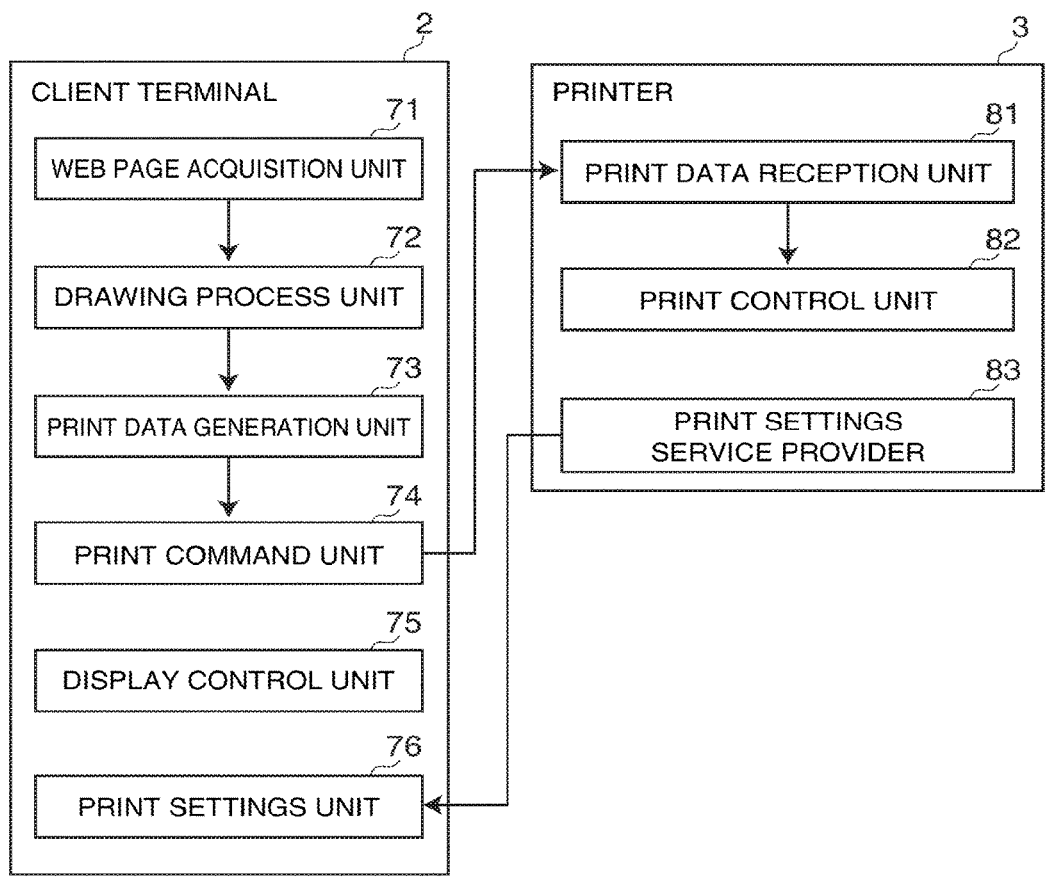

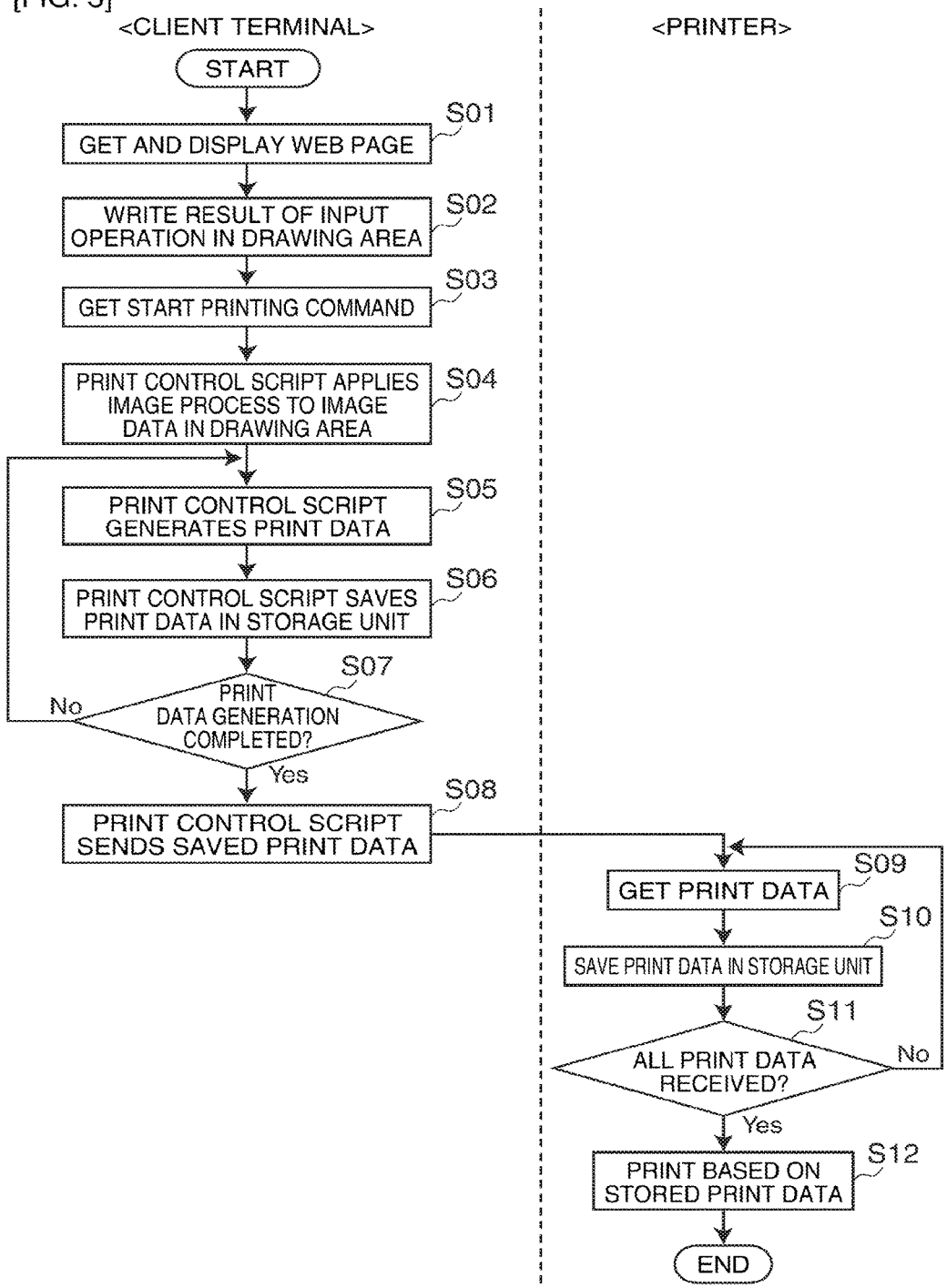
[FIG. 3]

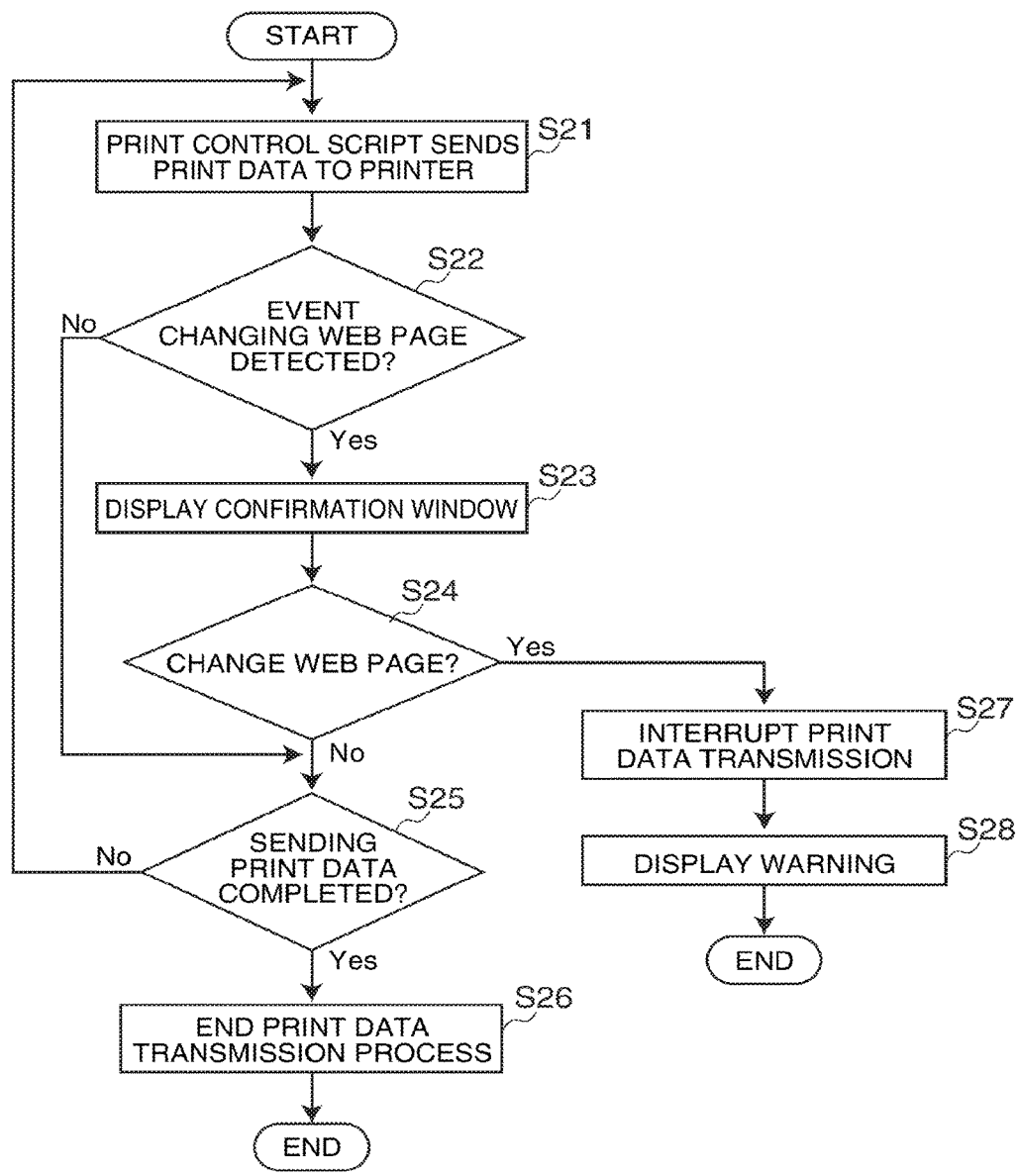

[FIG. 5]
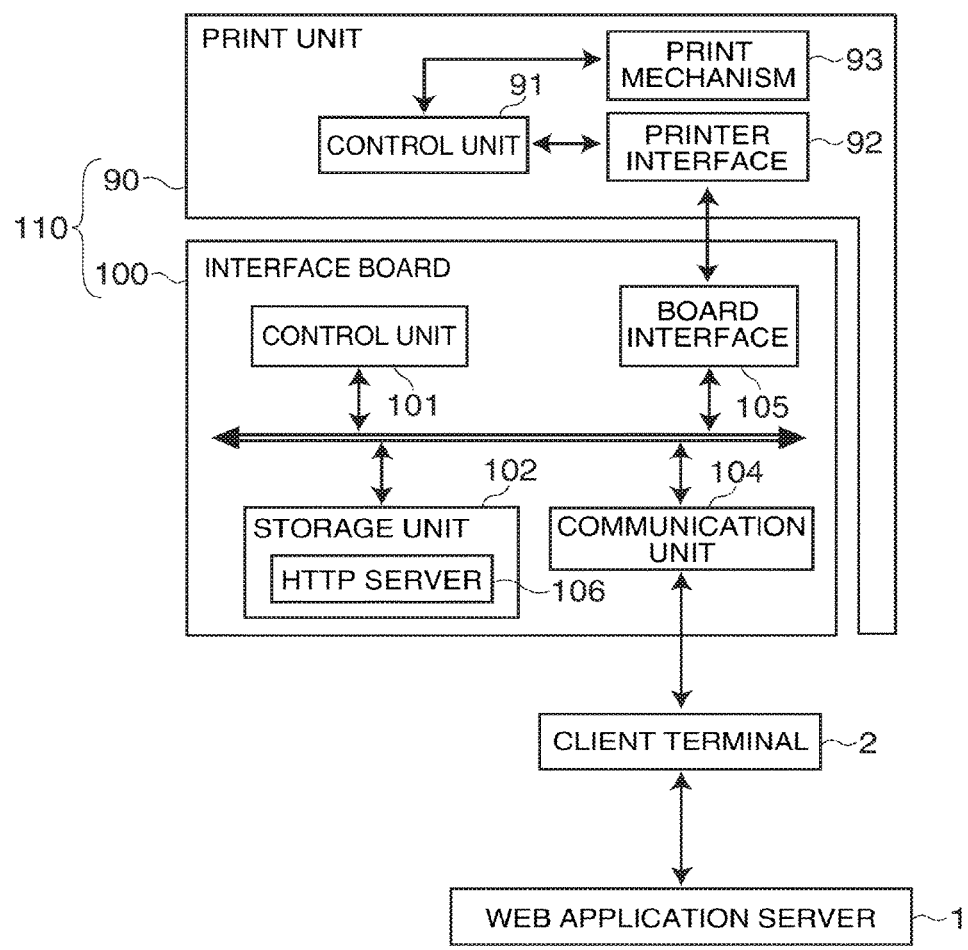

[FIG. 6]
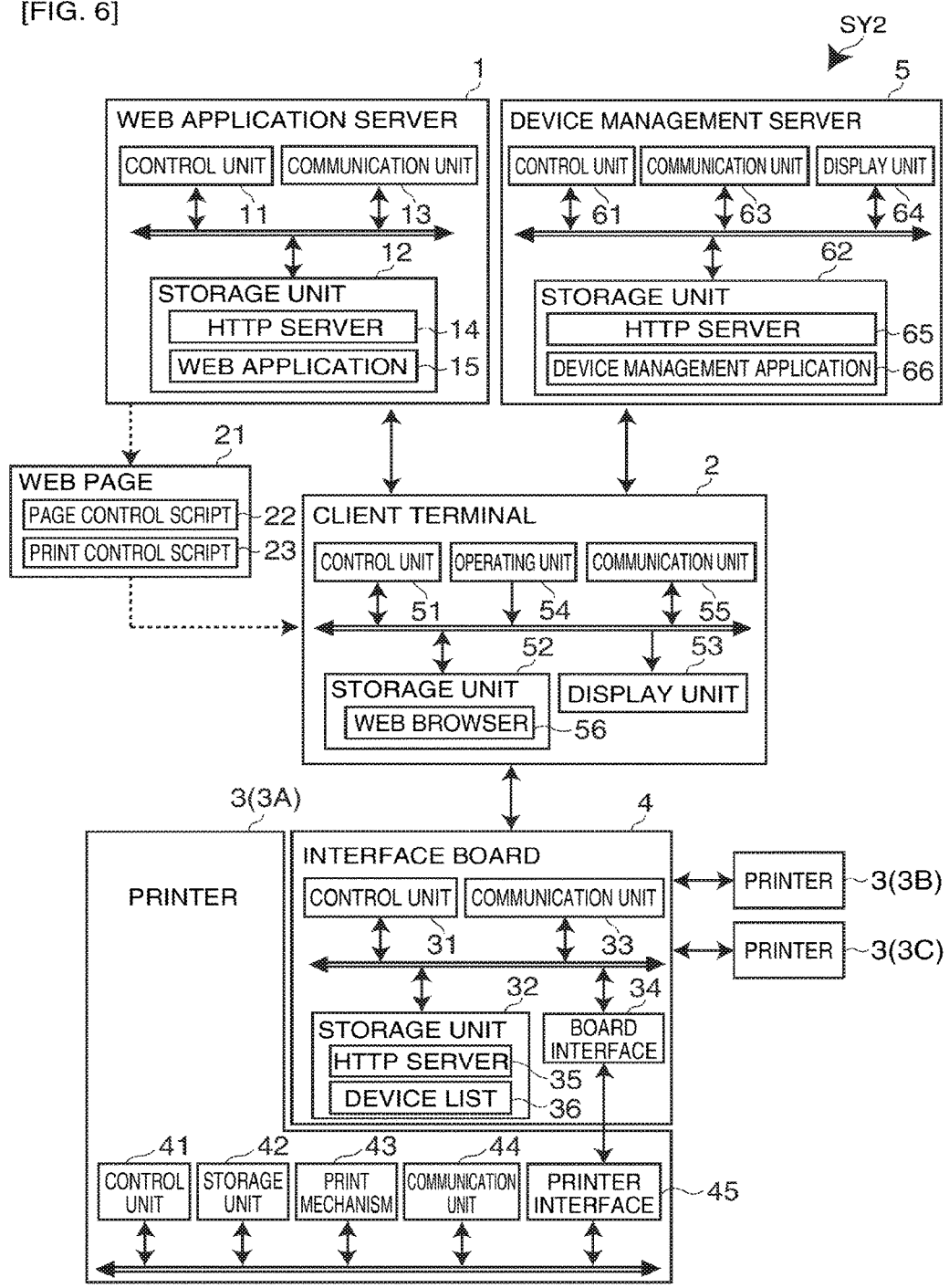

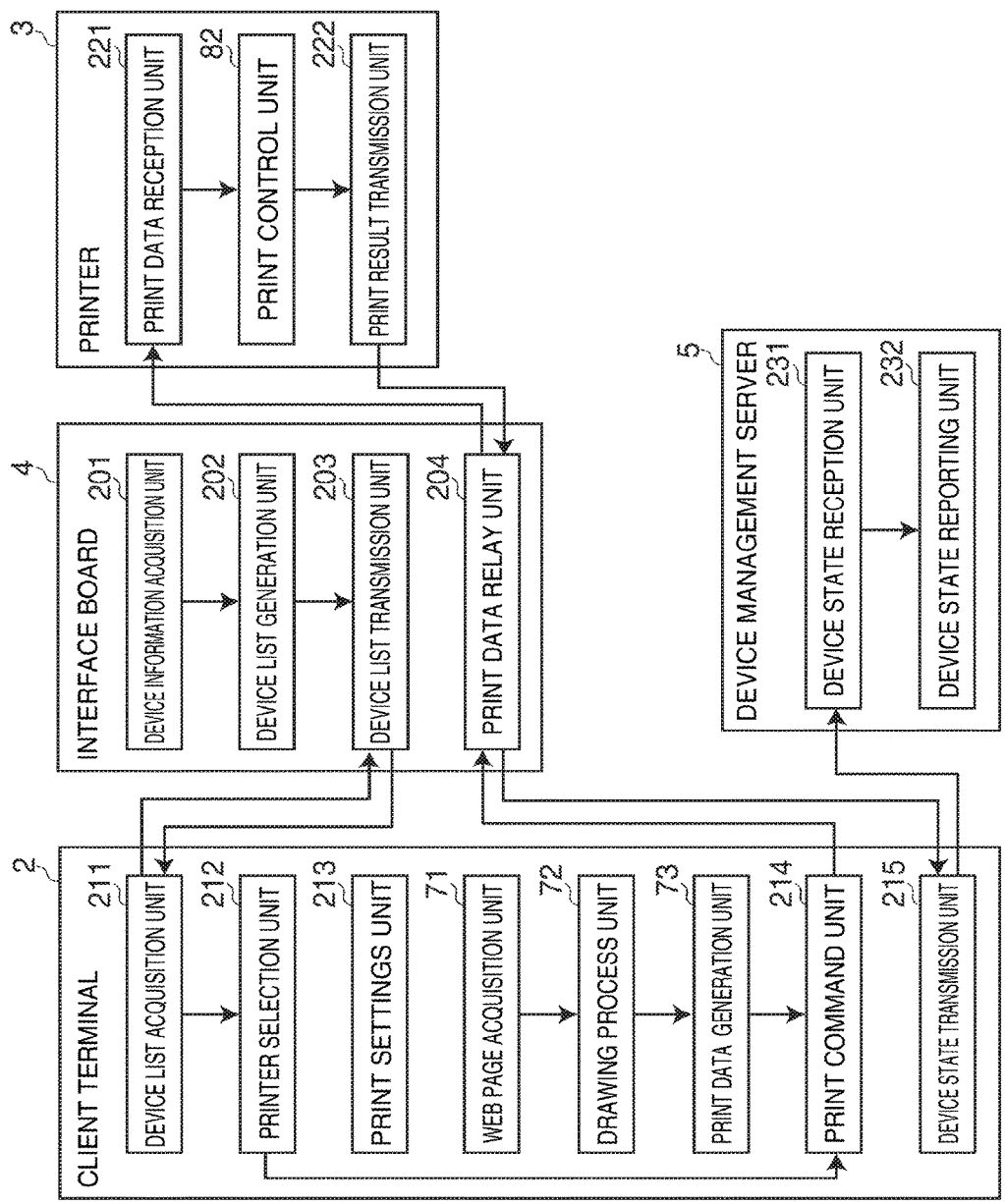

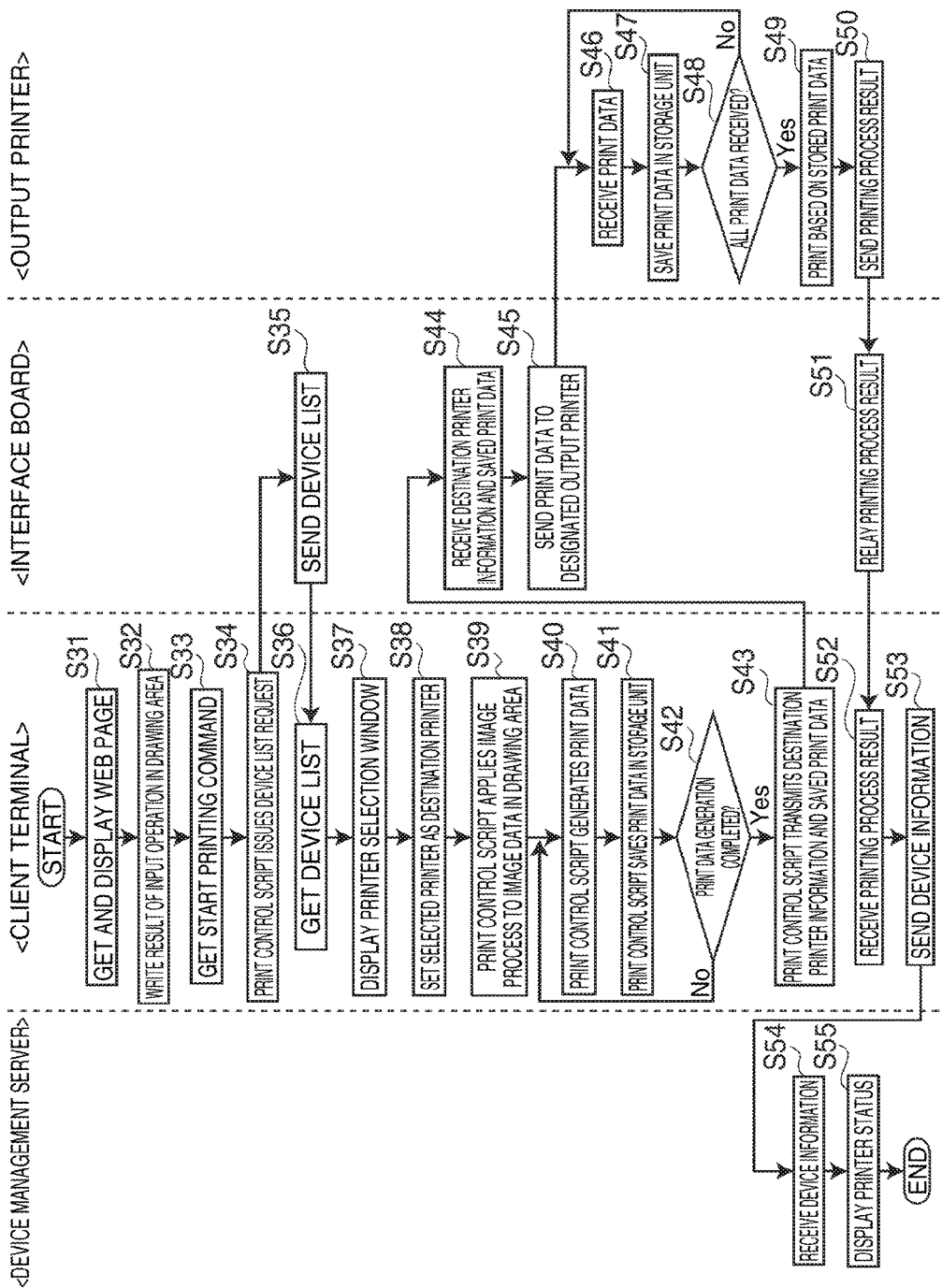
[FIG. 8]

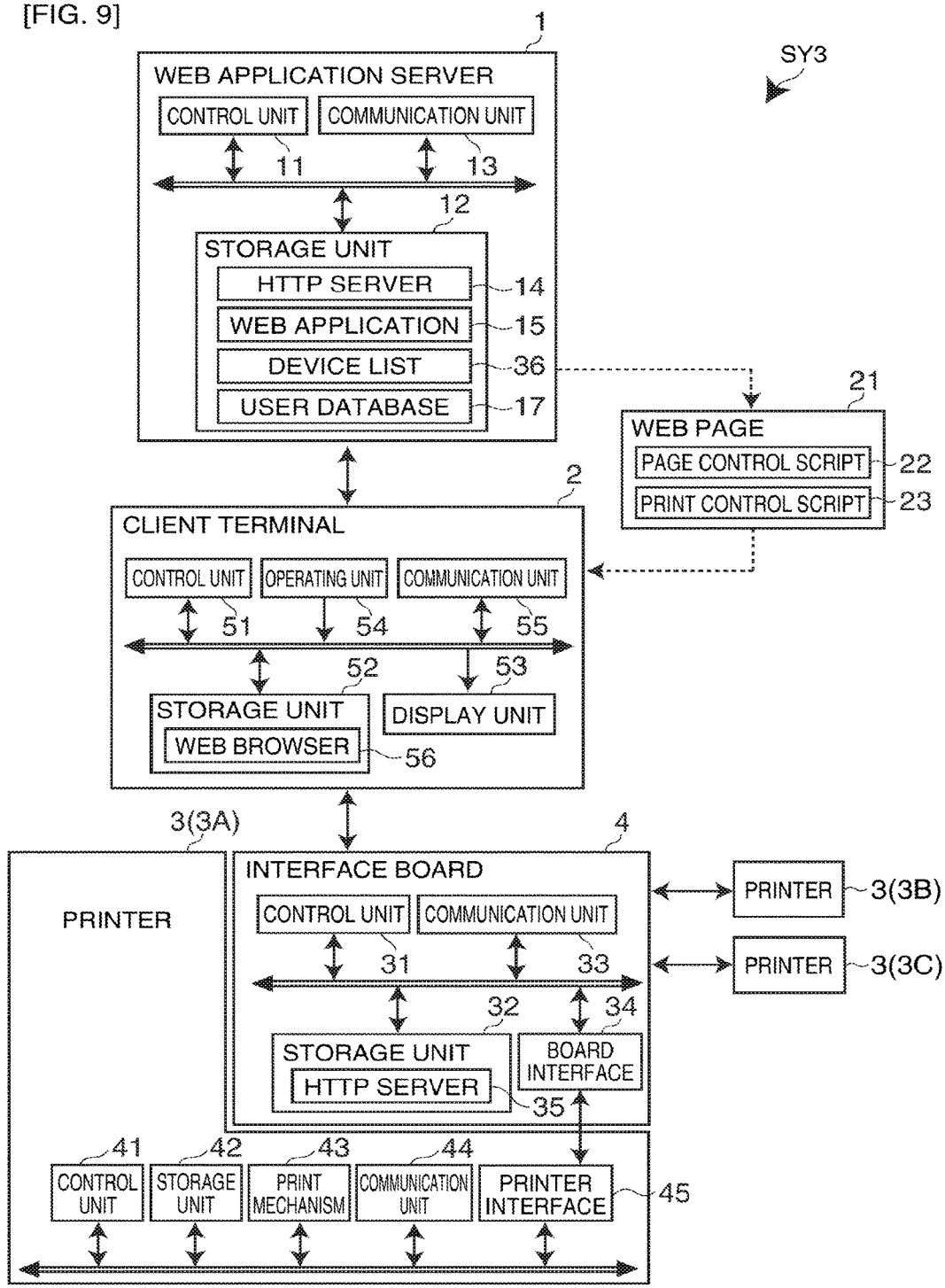

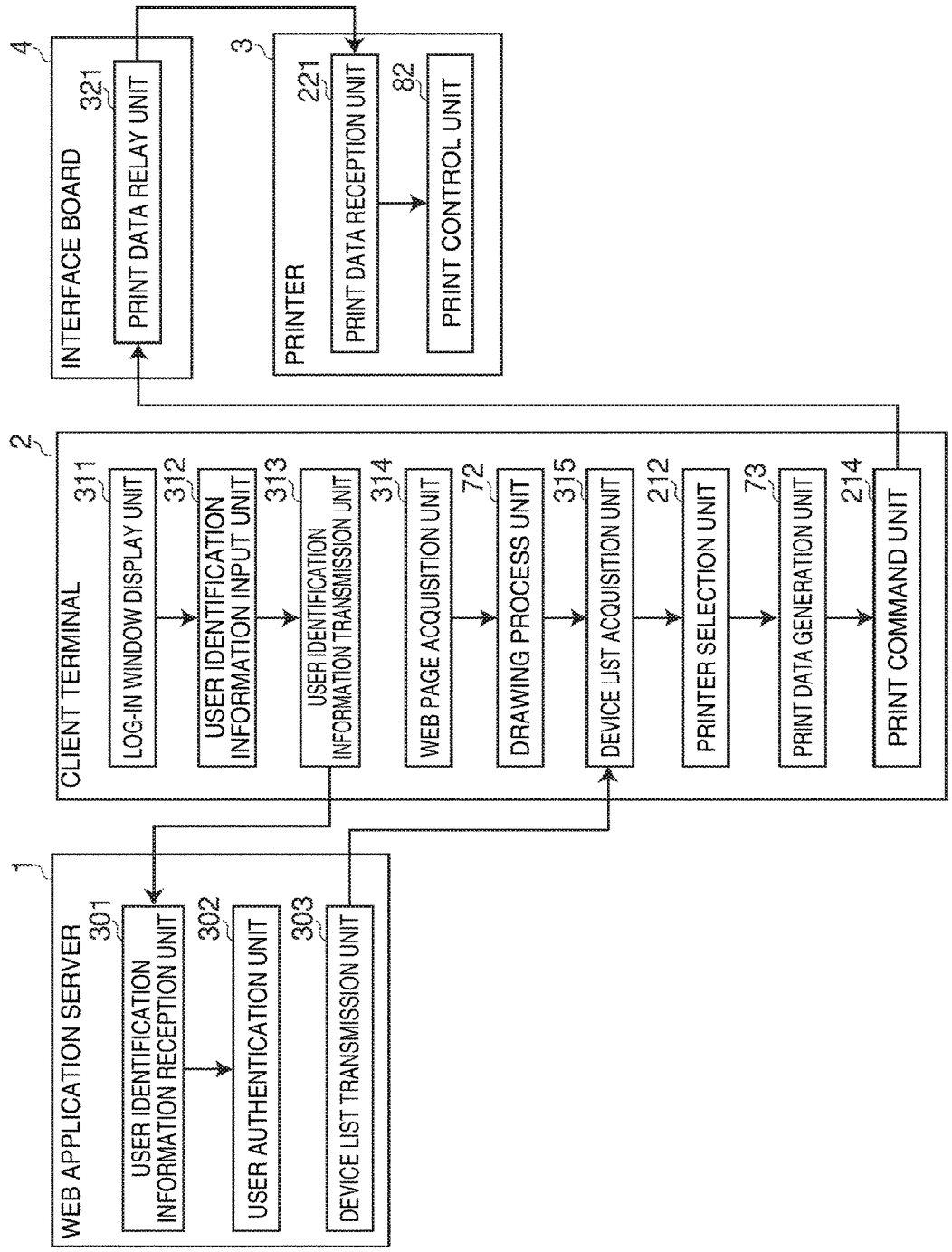

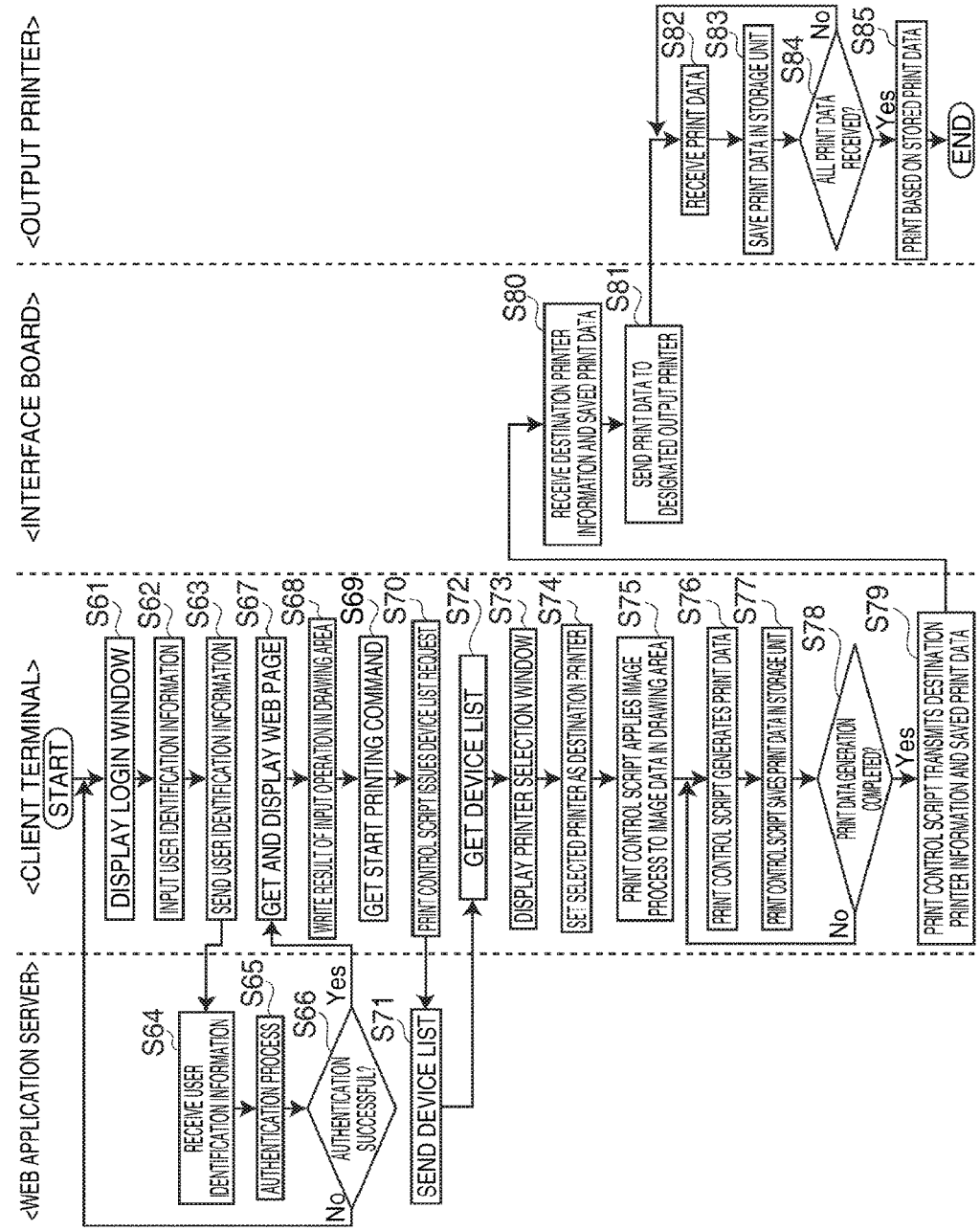
[FIG. 11]

[FIG. 12]
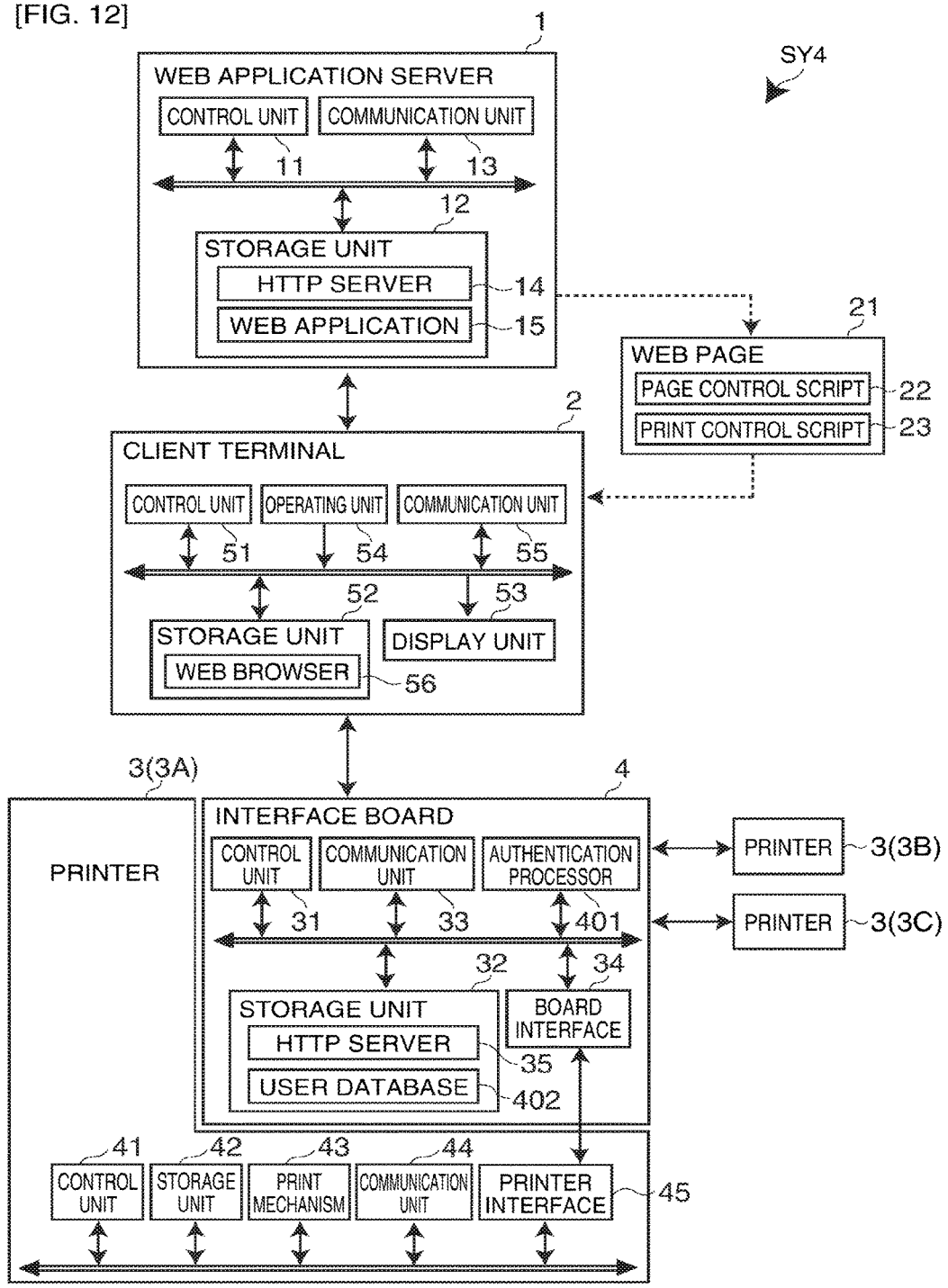

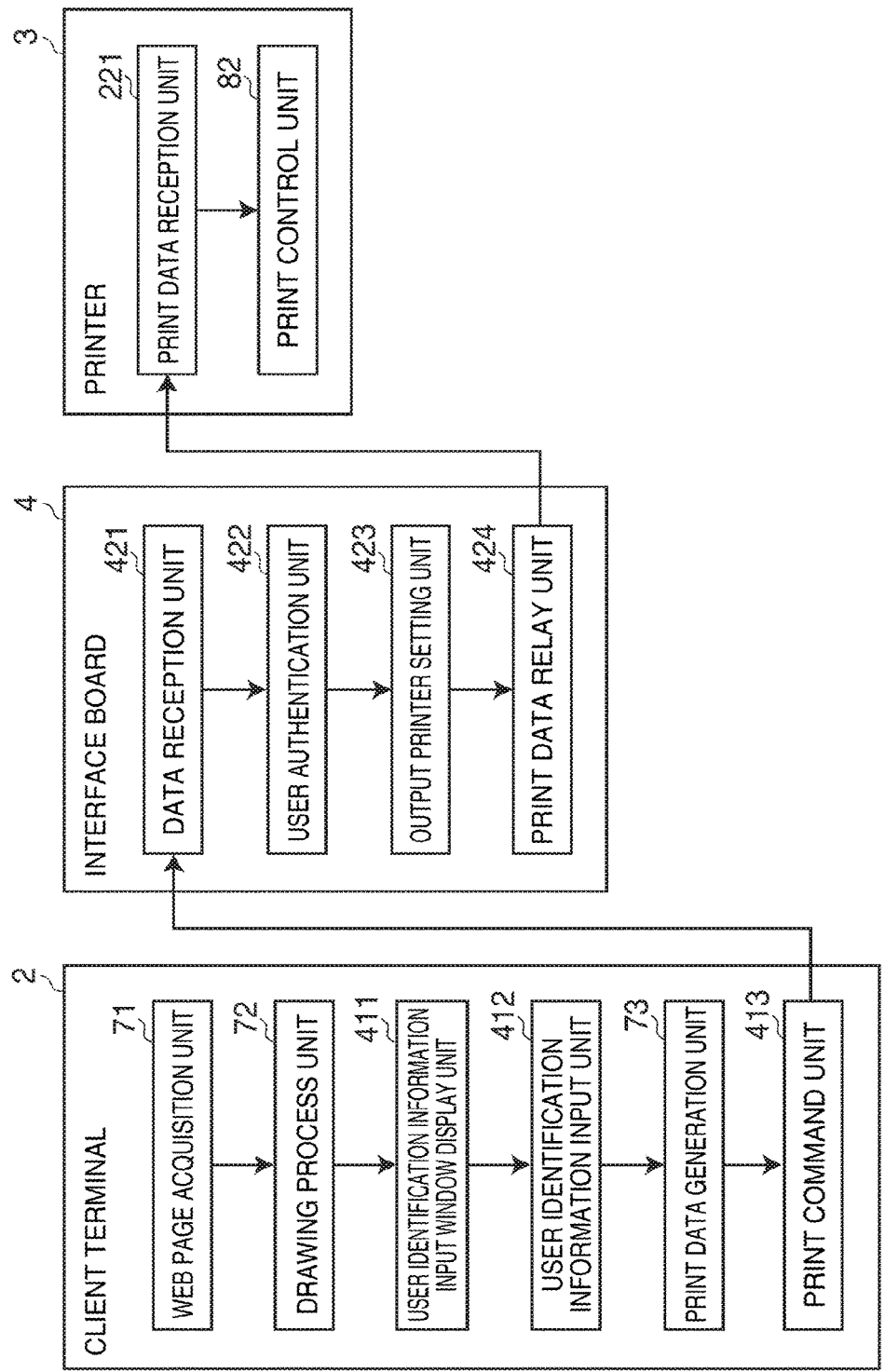

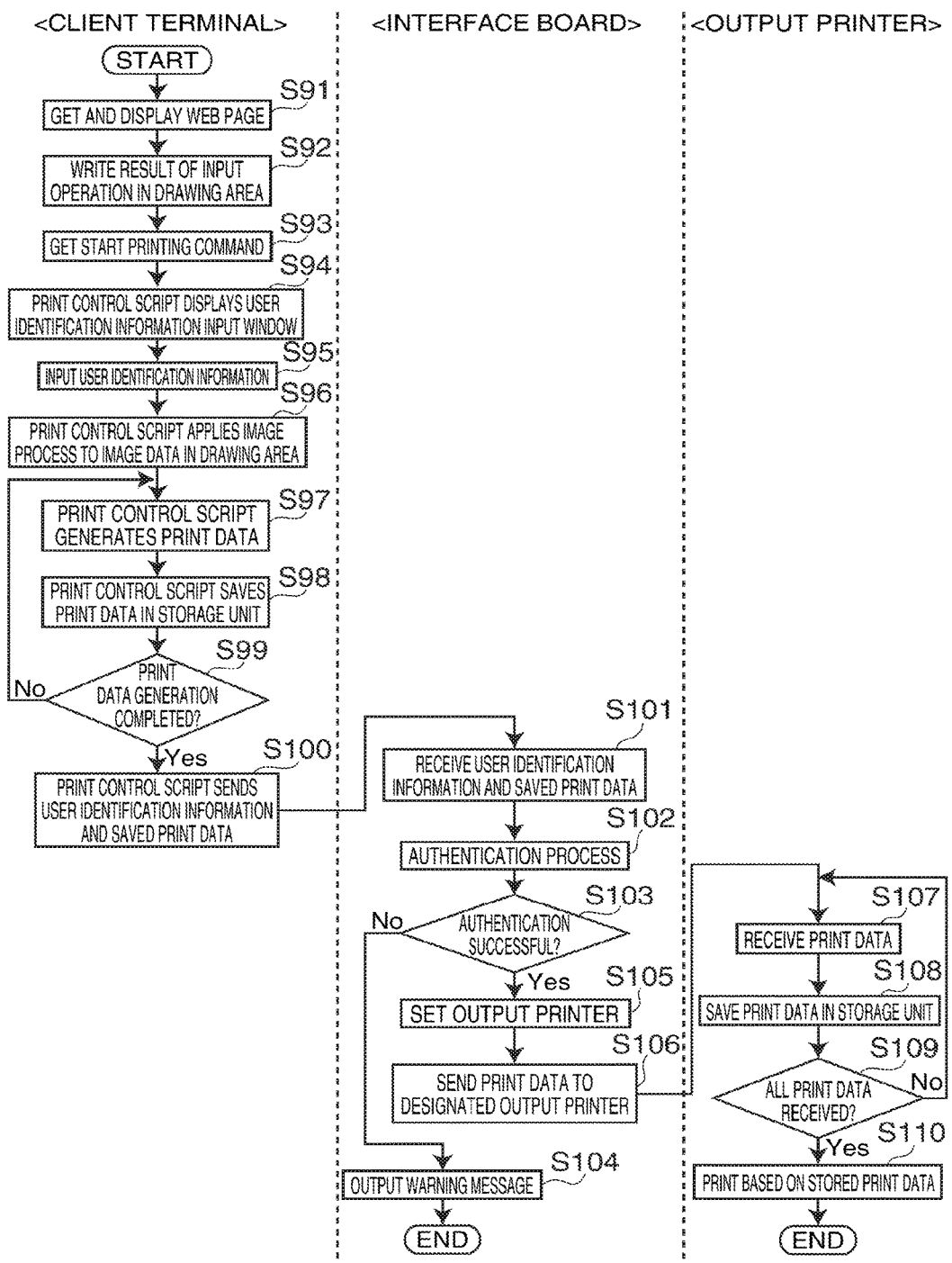
[FIG. 14]

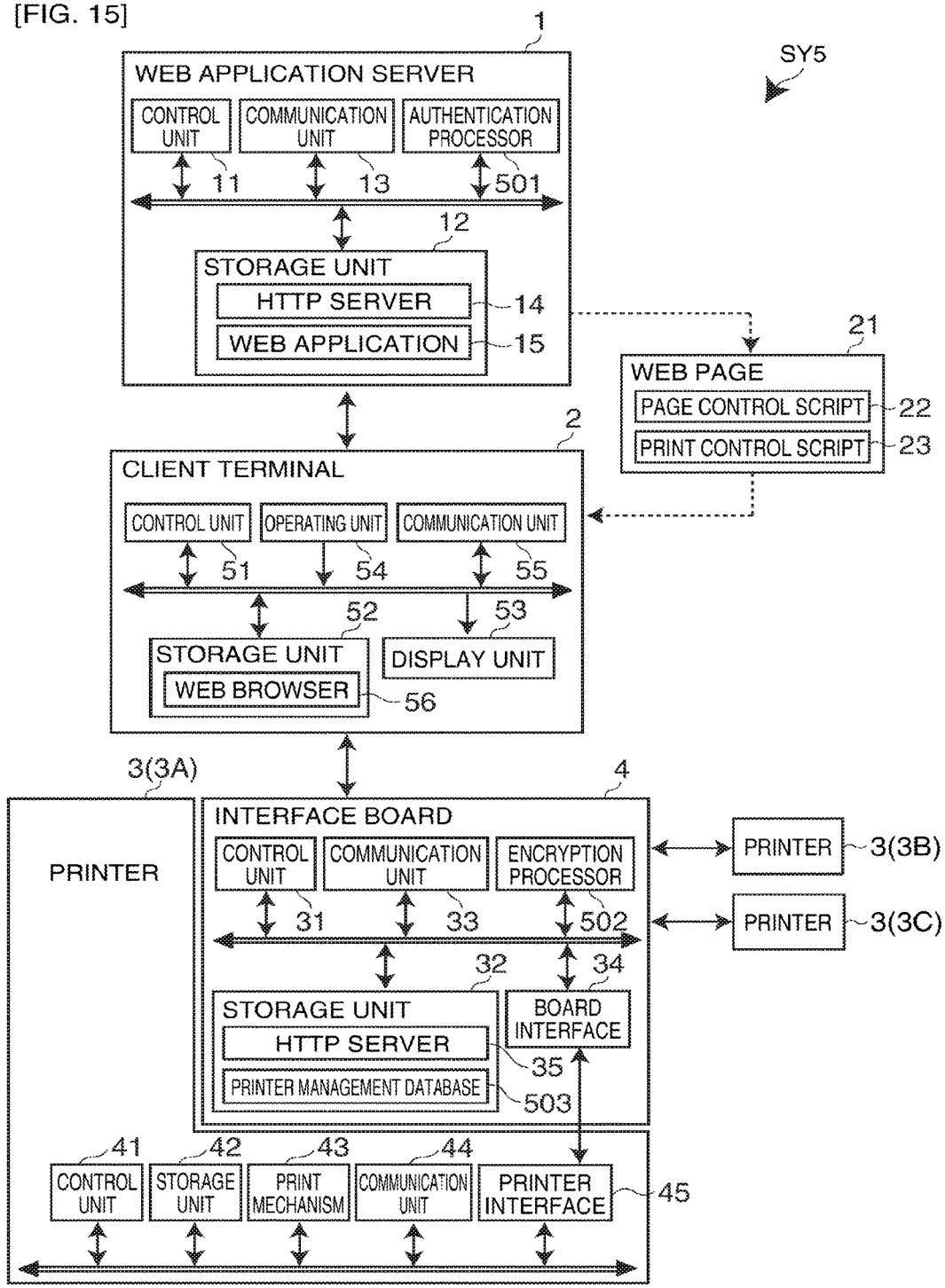

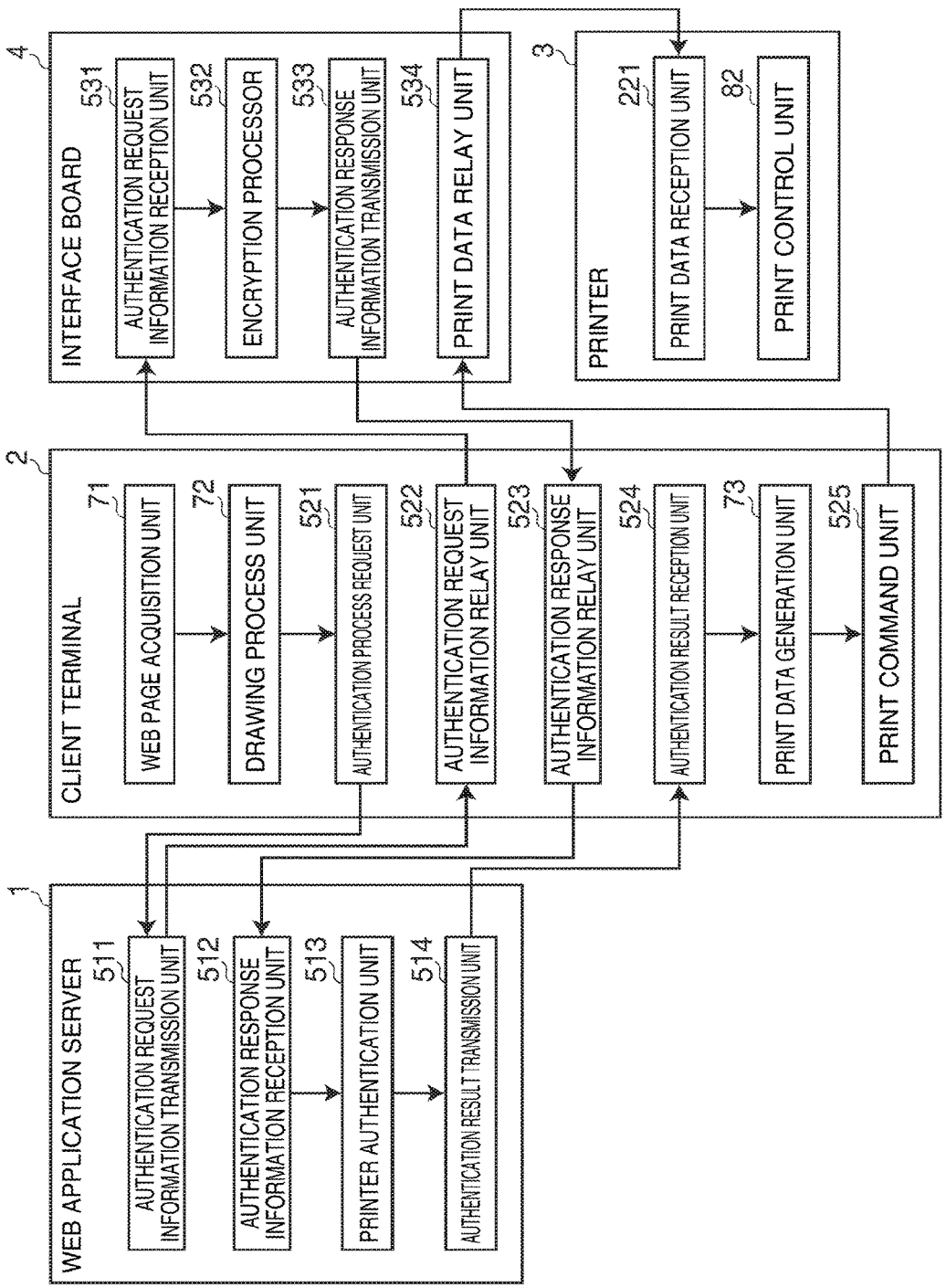
[FIG. 16]

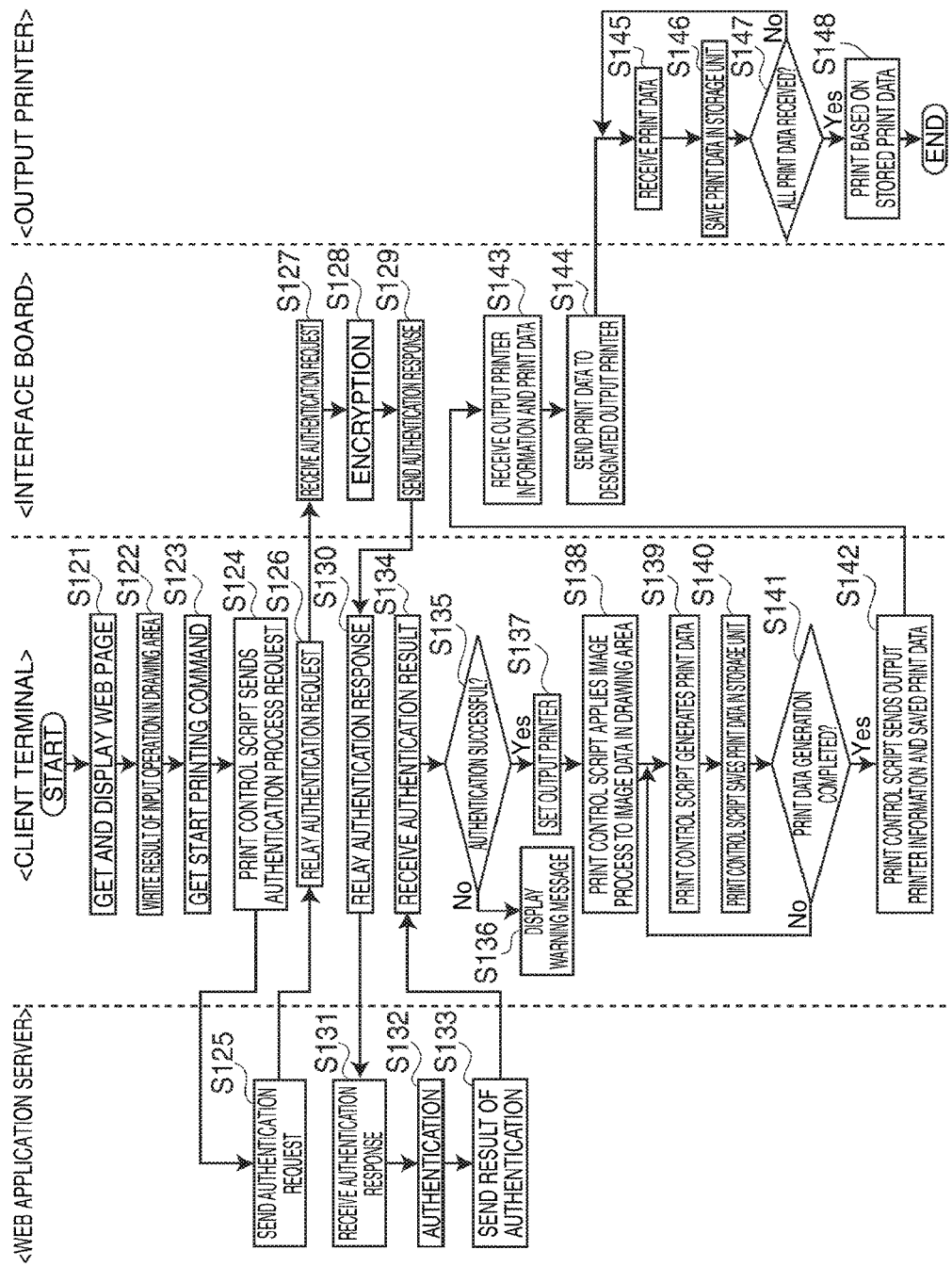

NETWORK SYSTEM, INTERFACE BOARD, METHOD OF CONTROLLING PRINTING ON AN NETWORK SYSTEM, AND PROGRAM

CROSS-REFERENCE TO RELATED APPLICATIONS

This application is a continuation of U.S. application Ser. No. 14/958,442, filed Dec. 3, 2015 and issued as U.S. Pat. No. 10,026,028 on Jul. 17, 2018; which is a continuation of U.S. application Ser. No. 14/600,325, filed Jan. 20, 2015; which is a continuation of U.S. application Ser. No. 13/978,731, filed Jul. 9, 2013; which is a National Stage Entry of International Appl. No. PCT/JP2012/053584, filed Feb. 8, 2012; which claims priority to Japanese Appl. No. 2011-027533, filed Feb. 10, 2011; Japanese Appl. No. 2011-028293, filed Feb. 14, 2011; and Japanese Appl. No. 2011-032858, filed Feb. 18, 2011; the disclosures of all of which are incorporated by reference herein in their entirety.

TECHNICAL FIELD

The present invention relates to a client terminal of a network system that controls a printer over a network, to a method of operating a client terminal in connection with controlling printing on a network system, and to a program.

BACKGROUND ART

Printers and other devices are commonly used connected to a computer over a network. In order to use these devices, device drivers to control them are required. These device drivers are usually installed to the computer connected to the devices. (See, for example, patent document 1.)

CITATION LIST

Patent Literature

[PTL 1] Japanese Unexamined Patent Appl. Pub. JP-A-2002-251347

SUMMARY OF INVENTION

Technical Problem

However, because device driver operation depends upon the operating system (OS) of the computer on which the device driver is installed, the user must install the device driver appropriate to the OS of the user's computer. This is difficult for users that are unfamiliar with computers, however, because of the difficulty of determining the version of the installed OS and installing software (device drivers). When the computer is replaced, the device driver must also be installed again. Device manufacturers must also develop device drivers that are compatible with different computer operating systems, thus increasing the cost of development.

With consideration for the foregoing problem, an object of the present invention is to provide a method of controlling a print control script embedded in a web page acquired by a client terminal from a web application, and a program for realizing the method, so as to enable controlling a printer without requiring a printer driver that is dependent upon the computer environment.

Solution to Problem

A method of controlling printing by a print control script embedded in a web page acquired by a client terminal from a web application server is provided. The method comprises, after the acquired web page is displayed, accepting an input operation on the displayed web page, and drawing a result of the input operation in a specific drawing area. The accepting and drawing operations are performed by the client terminal. The method further comprises generating print data by converting image data written in the specific drawing area to a form enabling processing by a printer as a result of a print operation performed on the displayed web page; and commanding the printer to print the print data.

The method may further include executing a device list acquisition step that acquires a device list from a device server; and selecting the printer from the device list. In this case, the commanding step issues a print command to the printer selected in the selecting step.

The method may further include, after displaying an identification information input window for inputting identification information, sending the identification information input by an input operation to the identification information input window to the web application server, and acquiring the web page when user authentication by the user authentication step succeeds. The sending and acquiring steps are performed by the client terminal. The method may further include acquiring the device list from the web application server; and selecting the printer from the acquired device list. In this case, the commanding step issues a print command to the printer selected by the selecting step.

The method may further include, after executing an identification information input window display step that displays an identification information input window for inputting identification information identifying a user of the client terminal, the commanding step executes a process that sends the print data to be printed linked to the identification information input by an input operation to the identification information input window to the device server according to the print control script as a print command for the printer.

Another aspect of the invention is a non-transitory computer-readable medium that stores a program that causes a computer to execute the steps of any of the methods described above.

Such arrangements enable printing a desired image (controlling printing by the printer) from a printer by means of a print control script embedded on a web page. More specifically, because printing by the printer is controlled by a script that runs on a web browser (operates inside the web page), installing a web browser on the client terminal is sufficient, and there is no need to install a printer driver on each client terminal as in the related art. In addition, there is also no need for the printer manufacturer to develop plural different printer drivers for different operating systems, and the related development cost can be reduced. Yet further, because there is no need to provide a special application execution environment on the printer side, device development and manufacturing costs can be reduced. Furthermore, because a web browser is normally installed on modern client terminals (computers including personal computers and smartphones), even users that are unfamiliar with computers can easily use a printer without being concerned about the operating environment (such as the operating system) of the terminal being used.

In arrangements that enable presetting the output printer, even users that are unfamiliar with computers can easily use a printer without being concerned about specifying the output printer if, for example, the system provider presets the output printer in the print control script.

In some aspects of the invention, when one or more printers are connected, a list of usable printers (device list)

is acquired by the print control script embedded in the web page, and the printer to be used for output can be selected (specified) from the device list and the desired images can be printed. More specifically, selecting a printer and running a printing process are enabled by simply installing a web browser on the client terminal without installing a printer driver on each client terminal as in the related art. Installing printer-specific functions on the client terminal side (web browser side) is also not necessary.

When one or more printers is connected, the web application server in these configurations performs user authentication, and only users allowed by authentication (for which authentication was successful) can select a printer from a printer list (device list) acquired by the print control script embedded in the web page and print desired images. More specifically, printer users can be authenticated and only permitted users enabled to select a usable printer and print if a web browser that acquires (displays) a web page is installed on the client terminal, and there is no need to install a printer driver on each individual client terminal as in the related art.

When more than one printer is connected, these configurations enable inputting identification information for identifying a user using the print control script embedded in the web page, and enable printing from a printer linked to the user if authentication based on the input identification information is successful. More specifically, printing can be enabled while limiting the users that can use a printer if a web browser that acquires (displays) a web page is installed on the client terminal, and there is no need to install a printer driver on each individual client terminal as in the related art.

When one or more printers are connected and printing is executed according to a print control script embedded in a web page, these configurations enable authenticating the connected printers and printing only from printers for which authentication succeeded (authentication was allowed). More specifically, printing is possible while limiting the printers used for output if a web browser that acquires (displays) a web page is installed on the client terminal, and there is no need to install a printer driver on each individual client terminal as in the related art. This can be used, for example, when restricting the printers that can be used for printing is desirable (when prohibiting printing on any printer is desirable), such as when printing confidential information or printing tickets.

Some configurations, enable high speed printing by performing the print data (such as raster image commands) generation process and the print data transmission process separately (not in parallel). Blemishes in the printed image can also be suppressed better in a low performance client terminal than when the print data generation process and print data transmission process are executed as parallel processes.

In some configurations, a confirmation window for confirming (selecting) whether or not to actually change the page when the web page changes is displayed. Because the invention achieves the function of a printer driver with a script (print control script), the print control script will disappear and printing be interrupted if the web page changes during the printing process. As a result, by displaying a confirmation screen when an event that changes the web page occurs, the operator (user) can be prevented from unintentionally changing the web page.

Some configurations can inform the user that the printing process was interrupted. For example, the user may not be aware that the web page changed due to an unintentional operation by the user, the print control script disappeared, and the printing process was interrupted, but this aspect of the invention prevents this by reporting interruption of the printing process. In arrangements that involve transmitting the print data and displaying the change-page confirmation window in parallel (in multiple threads), the printing process can continue while the change-page confirmation window is displayed to select whether or not to change the web page.

In some arrangements, the printer starts printing after all print data has been received. When a large amount of print data is received for printing, for example, this prevents the print control script from disappearing and the printing process stopping in the middle as a result of the web page changing while the print data is being received.

Some configurations segment and send the print data in data blocks sized to enable transmission in a single data communication. As a result, when a large amount of print data is sent for printing, for example, this prevents the print control script from disappearing and print data transmission from being interrupted midway as a result of the web page changing during print data transmission.

Some arrangements enable configuring the print settings of the printer according to the print control script. More specifically, printer settings can be checked or the user can desirably change the printer settings without installing a printer driver on each client terminal as in the related art. Note that the printer settings include, for example, the paper size, number of copies, print quality, color/BW printing, and image processing method.

The print settings made (changed) by the user may also be stored in a specific storage area. In this case the stored print settings can be read the next time something is printed, eliminating the need for the user to change the print settings every time.

In some arrangements, the device management server can centrally manage the status of all usable printers. As a result, the system administrator or device manufacturer, for example, can quickly take action when a problem occurs with a printer. Metered billing according to actual printer use, for example, is also possible.

Advantageous Effects of Invention

The invention thus enables controlling a printer without requiring a printer driver that depends on the computer environment.

BRIEF DESCRIPTION OF DRAWINGS

FIG. 1 is a system configuration diagram of a network system according to a first embodiment of the invention.

FIG. 2 is a block diagram showing the functional configuration of a network system according to the first embodiment of the invention.

FIG. 3 is a flow chart describing the printing process of a network system according to the first embodiment of the invention.

FIG. 4 is a flow chart describing the process of the network system according to the first embodiment of the invention when an event changing the web page occurs during print data transmission.

FIG. 5 is a system configuration diagram showing a variation of the network system according to the first embodiment of the invention.

FIG. 6 is a system configuration diagram of a network system according to a second embodiment of the invention.

FIG. 7 is a block diagram showing the functional configuration of the network system according to the second embodiment of the invention.

FIG. 8 is a flow chart describing the printing process of a network system according to the second embodiment of the invention.

FIG. 9 is a system configuration diagram of a network system according to a third embodiment of the invention.

FIG. 10 is a function block diagram of the network system according to the third embodiment of the invention.

FIG. 11 is a flow chart describing the user authentication process and printing process of a network system according to the third embodiment of the invention.

FIG. 12 is a system configuration diagram of a network system according to a fourth embodiment of the invention.

FIG. 13 is a function block diagram of the network system according to the fourth embodiment of the invention.

FIG. 14 is a flow chart describing the user authentication process and printing process of a network system according to the fourth embodiment of the invention.

FIG. 15 is a system configuration diagram of a network system according to a fifth embodiment of the invention.

FIG. 16 is a function block diagram of the network system according to the fifth embodiment of the invention.

FIG. 17 is a flowchart describing the printer authentication process and printing process of a network system according to the fifth embodiment of the invention.

DESCRIPTION OF EMBODIMENTS

A network system, an interface board, a method of controlling printing on a network system, and a program according to preferred embodiments of the invention are described below with reference to the accompanying figures. A network system according to the invention is a system that executes a printing process using a web browser without installing a dedicated printer driver on the client terminal.

Example 1

FIG. 1 is a system configuration diagram of a network system SY1 according to the first embodiment of the invention. As shown in FIG. 1, the network system SY1 includes a web application server 1, a client terminal 2 connected over the Internet to the web application server 1, and a printer 3 connected to the client terminal 2 over a LAN. Note that only one client terminal 2 and one printer 3 are shown in the example in FIG. 1, but the invention is not so limited and a configuration having a plurality of client terminals 2 and a plurality of printers 3 is also possible. Either a wired or a wireless connection could also be used to connect to the network (Internet or LAN).

The web application server 1 has the hardware configuration of a general computer in addition to a control unit 11, storage unit 12, and communication unit 13. The main parts of the control unit 11 include a CPU (central processing unit), ROM (read-only memory), and RAM (random access memory). The CPU runs a program stored in ROM, and controls operation of the web application server 1. ROM stores control data and a control program enabling the CPU to execute various processes. RAM is used as working memory when the CPU executes different processes. An HTTP server 14 and web application 15 are also stored in the storage unit 12.

The communication unit 13 is an interface for communicating with the client terminal 2 (web browser 56). Communication between the web application server 1 and client terminal 2 is controlled by the HTTP server 14 using Hypertext Transfer Protocol (HTTP). More specifically, the web application server 1 receives an HTTP request from the client terminal 2 (web browser 56), and based on the URL (Uniform Resource Locator) contained in the HTTP request, returns a web page 21 provided by the web application 15 to the client terminal 2.

As described in detail below, in addition to a page control script 22 (JavaScript®) for controlling the web page 21, the web page 21 includes a print control script 23 (JavaScript®) for controlling printing related to the web page 21, and the client terminal 2 executes a printing process by running the print control script 23 on the web browser 56 (on the web page 21).

The printer 3 has a control unit 41, storage unit 42, print mechanism 43, and communication unit 44 as main parts. The control unit 41 has a CPU and RAM as main parts. The CPU runs programs stored in the storage unit 42, and controls printer 3 operation. RAM is used as working memory for the CPU to execute processes. The storage unit 42 is, for example, nonvolatile memory (such as flash ROM), and stores control data and control programs enabling the CPU to run the processes. The storage unit 42 also stores an HTTP server 46.

The print mechanism 43 includes a paper feed mechanism, printhead, and paper cutting mechanism, and performs a printing operation as controlled by the CPU. The printing method is not limited, and could be an inkjet or laser printing method, for example.

The communication unit 44 is an interface for communicating with the client terminal 2. Communication between the printer 3 and client terminal 2 (web browser 56) is controlled by the HTTP server 46 using HTTP. More specifically, when print data is sent from the client terminal 2 to the service endpoint address (a URI (Uniform Resource Identifier) such as http://x.x.x.x/) assigned to the printer 3, the printer 3 (control unit 41) receives the print data and controls the print mechanism 43 to print based on the received print data.

The client terminal 2 includes a control unit 51, storage unit 52, display unit 53, operating unit 54, and communication unit 55 as main parts. The control unit 51 has a CPU and RAM as main parts. The CPU runs a program stored in storage unit 52 and controls client terminal 2 operation. RAM is used as working memory for the CPU to run processes. The storage unit 52 is, for example, a HDD (hard disk drive) or nonvolatile memory (such as flash ROM), and stores control data and control programs used by the CPU to execute different processes. The storage unit 52 also stores a web browser 56.

The display unit 53 displays a web page 21 acquired (downloaded) by the web browser 56 in a web browser 56 window, and displays configuration windows and windows for reporting different events accompanying operations performed in the web browser 56. These windows could be displayed in the web page 21 displayed by the web browser 56, or displayed in a new web page 21. The operating unit 54 is an operating means for performing input operations (such as inputting text and drawing figures), and making selection/decision operations and printing operations, in a web page 21 displayed by the web browser 56. Note that the display unit 53 and operating unit 54 may be rendered separately or rendered in unison by, for example, using a touch screen panel as the display unit 53.

The communication unit 55 is an interface for communication with the web application server 1 and printer 3, and the client terminal 2 (control unit 51) uses the web browser 56 to communicate with the web application server 1 and printer 3.

The web browser 56 is a simple browser (standard browser) with no plugin modules, and the client terminal 2 (control unit 51) uses this web browser 56 to access the web application server 1 and receive web pages 21 provided by the web application 15.

The web page 21 includes a page control script 22 and print control script 23 as described above, and when user input is received by the web browser 56, the page control script 22 draws the result of the input operation (text or image input result) in a specific screen area. This drawing area is a drawing canvas (HTML5 canvas element) defined (set) by the page control script 22, and the input content is drawn in this canvas area and stored as image data.

When the user issues a print command (such as by pressing a print button) on the web page 21, the web browser 56 runs the print control script 23 embedded in the web page 21, converts the image data written in the drawing area to create print data, and sends the print data to the printer 3 (the service endpoint at the printer 3). The service endpoint address of the printer 3 to which the print data is sent is specified in the print control script 23.

Note that when a plurality of printers 3 are connected, a printer 3 service endpoint address that differs according to the print control script 23 contained in the web page 21 could be specified according to the type of the web page 21 (such as the content provided by the web page 21). More specifically, different output printers 3 could be specified according to the type of web page 21. The client terminal 2 may be any computer on which the web browser 56 operates, and may be a mobile terminal (such as a cellular telephone or smartphone), personal computer (PC), or other type of device.

The functional configuration of the network system SY1 is described next with reference to FIG. 2. The client terminal 2 has a web page acquisition unit 71, drawing process unit 72, print data generation unit 73, print command unit 74, display control unit 75, and print settings unit 76.

The web page acquisition unit 71 has the control unit 51 and web browser 56 as main parts, and uses the web browser 56 to access the web application server 1 (web application 15) and get the desired web page 21 (the web page 21 containing the page control script 22 and print control script 23).

The drawing process unit 72 has the control unit 51 and page control script 22 as main parts, and when the user performs an input operation on the acquired web page 21 (the web page 21 displayed by the web browser 56), writes the result of the input operation in the drawing area.

The print data generation unit 73 has the control unit 51 and print control script 23 as main parts, and when the user performs a print operation on the acquired web page 21 (the web page 21 displayed by the web browser 56), runs the print control script 23 to generate print data by converting the data written in the drawing area to a form enabling processing by the printer 3 (such as raster image commands, bitmap files, or XML print data). More specifically, the print control script 23 checks the pixel values of the image data written in the drawing area, applies an image process such as digitizing or dithering, and generates print data that can be processed by the printer 3. The print data generation unit 73 also temporarily stores the generated print data in a specific storage area (storage unit 52). Temporarily storing the print data can be done using a web storage device, for example. The page control script 22 detects print operations, and when triggered by detecting a print operation the page control script 22 calls the print control script 23 to run the process for generating and temporarily storing the print data.

The print command unit 74 has the control unit 51, communication unit 55 and print control script 23 as main parts, and sends the print data stored by the print data generation unit 73 to the printer 3. More specifically, the print data generating process (a process of the print data generation unit 73) and the print data transmission process (a process of the print command unit 74) are not executed as parallel processes, and transmission of the print data starts after all print data has been generated. Note that when the web page 21 changes (a page unload event occurs) while print data is being sent, the print command unit 74 interrupts transmission. This is because the print control script 23, which is an element of the print command unit 74, is embedded in the web page 21, and when the web page 21 changes, the print control script 23 disappears.

The display control unit 75 has the control unit 51, display unit 53 and print control script 23 as main parts, and reports events that occur during the printing process controlled by the print control script 23 to the user. More specifically, when the user performs an action (invokes a before unload event) to change the currently displayed web page 21 while the print data is being transmitted, the display control unit 75 displays a confirmation window on the display unit 53 enabling the user to confirm whether or not to change the web page 21. If changing the web page 21 is confirmed in this confirmation window (an unload event occurs), the display control unit 75 displays a warning that print data transmission was interrupted.

Note that the print command unit 74 continues sending the print data while the confirmation window is displayed by the display control unit 75. More specifically, the print control script 23 displays the confirmation window and continues sending the print data at the same time. Parallel processes can be achieved by, for example, using a web worker to run both processes in separate threads.

The print settings unit 76 has the control unit 51 and print control script 23 as main parts. When a printing process executes (when the user performs a printing operation on the web page 21), the print settings unit 76 prompts the user to input print settings (such as the paper size and number of copies as described below) using the print settings service provided by the printer 3 (the print settings service provider 83 described below). The user settings information is stored in a web browser 56 cookie or the web storage device, and when the next printing process is performed, the stored print settings are read and the print settings are restored.

The printer 3 has a print data receiving unit 81, print control unit 82, and print settings service provider 83. The print data receiving unit 81 has the control unit 41, communication unit 44 and HTTP server 46 as main parts, and receives the print data sent from the client terminal 2.

The print control unit 82 has the control unit 41 and print mechanism 43 as main parts, and controls printing an image based on the received print data received by the print data receiving unit 81. The print control unit 82 prints in this printing process after all print data sent from the client terminal 2 has been received. More specifically, the print data sent from the client terminal 2 is temporarily stored in a specific area in the storage unit 42, and after all print data has been received, the stored print data is read to execute the printing process.

The print settings service provider 83 includes the control unit 41 and HTTP server 46 as main parts, and provides a print settings service (printing configuration function) for configuring printing by the printer 3 to the client terminal 2. This print settings service is provided as a user interface (UI) on the web page or as a web service API (Application Programming Interface), and enables setting the paper size, number of copies, print quality, color/BW printing, and the image processing method, for example.

The printing process of the network system SY1 is described next with reference to the flow chart in FIG. 3. First, the client terminal 2 (control unit 51) accesses the web application server 1 (web application 15) based on user operation of the web browser 56, gets the desired web page 21 (a web page 21 containing the page control script 22 and print control script 23), and displays the web page 21 on the web browser 56 (S01, web page acquisition step, display step).

When the user then performs an input operation on the web page 21, the client terminal 2 receives the user input according to the page control script 22 embedded on the web page 21, and writes the received result of the input operation in the drawing area (S02, drawing process step). After the content is drawn on screen and the user performs a print operation on the web page 21, the client terminal 2 receives a start printing command in conjunction with the print operation from the page control script 22 (S03). Triggered by receiving the start printing command, the print control script 23 is called from the page control script 22, and the printing process starts.

More specifically, the client terminal 2 applies an image process such as digitizing or dithering to the image data written in the drawing area (S04), generates print data converted to a format that can be processed by the printer 3 (S05, print data generation step), and saves the generated print data in the storage unit 52 (S06), according to the print control script 23. Note that steps S05 and S06 repeat until print data generation is completed, that is, until all image data written in the drawing area is converted to print data (S07 returns No).

When generating the print data is completed (S07 returns Yes), the client terminal 2 sends the print data saved in the storage unit 52 to the printer 3 (service endpoint address of the printer 3) according to the print control script 23 (S08, printing instruction step). Note that the control process called when an event that changes the web page 21 occurs as a result of the user operating the browser while the print data is being sent is described below with reference to FIG. 4.

When print data is received from the client terminal 2 (S09), the printer 3 saves the print data in the storage unit 42 (S10). Steps S09 and S10 repeat until all print data is received (S11 returns No). When all print data has been received and stored (S11 returns Yes), the printer 3 reads the stored print data and prints based thereon (prints an image) (S12).

The process that is run when an event that changes the web page 21 occurs while print data is being sent by the client terminal 2 is described next with reference to the flow chart in FIG. 4. Note that the print data to be sent in this process was already generated by steps S01 to S07 in FIG. 3. In addition, because a special process is not performed when an event changing the web page 21 does not occur, further description thereof is omitted in the description of the flow chart in FIG. 4.

After generating and storing the print data by means of the print control script 23, the client terminal 2 (control unit 51) starts sending the print data to the printer 3 (S21). If an event that changes the displayed web page 21 (that is, the web page 21 in which the currently executing print control script 23 is embedded) to a different page occurs (S22 returns Yes) as a result of the user operating the web browser 56 while print data is being transmitted, the client terminal 2 displays a confirmation window for selecting whether or not to change the web page 21 on the display unit 53 while continuing sending the print data by means of the print control script 23 (S23).

If the user chooses to cancel changing the web page 21 in this confirmation window (S24 returns No), the client terminal 2 continues the transmission process until print data transmission is completed by means of the print control script 23 (S25 returns No), and when all print data has been transmitted (S25 returns Yes), ends the transmission process (S26).

However, if the user confirms changing the web page 21 in the confirmation window (S24 returns Yes), the client terminal 2 stops sending the print data in conjunction with the print control script 23 being cleared (S27), and presents a warning that print data transmission was interrupted on the display unit 53 (S28).

As described above, this first embodiment of the invention enables using a print control script 23 embedded in a web page 21 to print a specific image from a printer 3. More specifically, because a script that operates in a web browser 56 (operates in a web page 21) controls printing by the printer 3, simply installing a web browser 56 on the client terminal 2 is sufficient, and installing a printer driver on each client terminal 2 as required by the related art is not necessary. The cost of development can also be reduced for the printer 3 manufacturer because the need to develop different printer drivers for each operating system is eliminated. In addition, because there is also no need to install a special application execution environment on the printer 3, the cost of printer development and manufacturing can also be suppressed.

Furthermore, because a web browser 56 is typically installed as standard on most modern client terminals 2 (including personal computers and smartphones), users that are unfamiliar with computers can easily use a printer 3 without being aware of the operating environment (such as the type of OS) that is being used.

The foregoing first embodiment describes a configuration in which the printer 3 directly receives the print data sent from the client terminal 2 and runs the printing process, but the invention is not so limited. For example, as shown in FIG. 5, a configuration in which an interface board 100 (installable board) that is removably installed to the print unit 90 receives the print data sent from the client terminal 2 and runs the printing process is also conceivable. In this case, the printer 110 is rendered by the interface board 100 and print unit 90, and the interface board 100 is connected to the print unit 90 through the board interface 105 and printer interface 92. The print unit 90 gets the print data from the interface board 100 through the printer interface 92, and controls the print mechanism 93 by the control unit 91. Note that reference numerals 101, 102, 104, 106 in the interface board 100 in FIG. 5 function as reference numerals 41, 42, 44, 46 of the printer 3 in FIG. 1. The invention can therefore be introduced with general-use printers because no special function needs to be incorporated into the print unit 90.

Example 2

A network system SY2 according to a second embodiment of the invention is described next with reference to FIG. 6 to FIG. 8. The network system SY2 according to the second embodiment of the invention differs from the network system SY1 according to the first embodiment of the invention in that a plurality of printers 3 (3A to 3C) are connected through the interface board 4 (device server); a list of usable printers 3 is generated by a function provided by the interface board 4, and the desired printer 3 (the printer 3 selected for output) is specified from the list using a web browser 56 on the client terminal 2 and prints; and the printer 3 status is managed by a device management server 5. Other aspects of this embodiment are the same as the network system SY1 according to the first embodiment of the invention.

Note that parts that are the same as in the first embodiment are identified by like reference numerals in this second embodiment of the invention, and further detailed description thereof is omitted. In addition, variations that are applicable to like parts of the first embodiment can be similarly applied in the second embodiment. The differences in particular are described below.

FIG. 6 shows the configuration of the network system SY2. As shown in FIG. 6, the network system SY2 includes a web application server 1, client terminal 2 (one shown in FIG. 6), a printer 3 (three printers 3A, 3B, 3C shown in FIG. 6), a (removable) interface board 4 connected to the printers 3, and a device management server 5 that manages the status of all printers 3.

The web application server 1 and the client terminal 2, and the client terminal 2 and the device management server 5, are communicatively connected over the Internet. The client terminal 2 and interface board 4 are communicatively connected over a LAN. An interface board 4 is installed to one printer 3 (printer 3A in the second embodiment), and the other two printers 3 (printers 3B and 3C) are connected through a communication unit 33 on the interface board 4. Note that FIG. 6 shows an example having one client terminal 2 and three printers 3, but the invention is not so limited and the number of each can be determined as desired.

The interface board 4 has a control unit 31, storage unit 32, communication unit 33 and board interface 34. The control unit 31 primarily includes a CPU and RAM. The CPU runs a program stored in the storage unit 32 and controls interface board 4 operation. RAM is used as working memory for the CPU to execute processes. The storage unit 32 is nonvolatile memory (such as flash ROM), and stores control data and control programs for the CPU to execute the processes. The storage unit 32 also stores a list of HTTP servers 35 and usable (connected) printers 3 (referred to below as the device list 36).

Information contained in the device list 36 ("device information" below) includes as basic device information for each printer 3 the printer ID and printer name assigned to the printer 3, and the communication port to which the printer 3 is connected. Detailed device information includes the printer 3 status (normal/error); the print settings (paper size, number of copies, print quality, color/BW printing, image processing method); optional device information about any optional devices (such as a paper feed cassette or duplex printing unit) connected to the printer 3; and consumables information (such as how much paper is left and the remaining ink level). Note that this device information is described for example only, and the invention is not limited thereto.

The board interface 34 is a port for installation to the printer 3 (printer 3A), and communication with the printer 3A passes through this board interface 34. The communication unit 33 is an interface for communicating with the client terminal 2 and another printer 3 (printers 3B and 3C in the second embodiment), and is a group of interfaces compatible with different kinds of connections, such as a LAN interface and a USB interface.

The HTTP server 35 handles communication between the interface board 4 and the client terminal 2 (web browser 56) using HTTP. More specifically, when device information (printer ID and communication port) for the output printer 3 and the print data are sent from the client terminal 2 to the service endpoint address (URI) assigned to the interface board 4, the interface board 4 sends the received print data to the printer 3 identified as the output address (as further described below).

The printer 3 is primarily composed of the control unit 41, storage unit 42, print mechanism 43, communication unit 44, and printer interface 45. Note that because printers 3A, 3B, and 3C are identical, only the configuration of printer 3A is shown in FIG. 6.

The printer interface 45 connects to the interface board 4 (board interface 34) and handles communications (is a port for installing the interface board 4). The communication unit 44 is an interface for communicating with the interface board 4, and is a group of interfaces compatible with different kinds of connections, such as a LAN interface and a USB interface. The printer 3 receives and prints print data sent from the client terminal 2 (through the interface board 4) through the printer interface 45 or the communication unit 44. The printer 3 also sends the result of the printing process (the status of the printer 3 (device information), such as printing completed or error occurred) to the client terminal 2 (through the interface board 4).

Note that, as described above, because the interface board 4 is installed to printer 3A in the second embodiment, printer 3A communicates through the printer interface 45 with the interface board 4, and printers 3B and 3C communicate through the communication unit 44 with the interface board 4. More specifically, the communication unit 44 of printer 3A is unused (not connected), and the printer interfaces 45 of printers 3B and 3C are unused (not connected), in this second embodiment.

The client terminal 2 includes as main parts a control unit 51, storage unit 52, display unit 53, operating unit 54, and communication unit 55. The communication unit 55 is an interface for communicating with the web application server 1, interface board 4 and device management server 5, and the client terminal 2 (control unit 51) communicates with other devices through the web browser 56.

More specifically, the client terminal 2 uses the web browser 56 to access a web application server 1 connected to the network, and get a web page 21 (containing page control script 22 and print control script 23) provided by the web application 15.

When the user performs a print operation on the web page 21, the web browser 56 runs the print control script 23 embedded on the web page 21, gets the device list 36 from the interface board 4, and based thereon displays a printer selection window for selecting the output printer 3 (in this second embodiment, a window for selecting one of printers 3A to 3C). When the desired printer 3 is selected from the list in the printer selection window and a print command is issued by the user, the image data written in the drawing area is converted to produce print data, and the print data is sent with the device information (printer ID, port information) for the specified printer 3 to the interface board 4 (the service endpoint of the interface board 4).

The client terminal 2 also sends the device information for the printer 3 to the device management server 5. This device information includes at least the basic device information (printer ID, printer name, communication port) and the printer 3 status. Information that is updated based on the result of each printing process (printing completed or error occurred) received from the printer 3 is sent as the printer 3 status. Note that the device information sent to the device management server 5 is not limited to the above, and sending other device information is also possible.

In addition to a control unit 61, storage unit 62, communication unit 63, and display unit 64, the device management server 5 also has the hardware components of a typical computer. The control unit 61 includes primarily a CPU, ROM, and RAM. The CPU runs a program stored in ROM, and controls device management server 5 operation. ROM stores control data and a control program enabling the CPU to run different processes. RAM is used as working memory for the CPU to execute processes. The storage unit 62 stores a device management application 66 for centrally managing the HTTP server 65 and printer 3 status.

The communication unit 63 is an interface for communicating with the client terminal 2 (web browser 56). Communication between the device management server 5 and client terminal 2 is managed by the HTTP server 65 using HTTP, and device information (basic device information and printer status) is acquired (received) from the client terminal 2. The display unit 64 is an LCD panel, for example, and displays the status of each printer 3 based on the device information acquired from the client terminal 2 in an application window of the device management application 66.

The functional configuration of the network system SY2 is described next with reference to FIG. 7. The interface board 4 has a device information acquisition unit 201, device list generation unit 202, device list transmission unit 203, and print data relay unit 204. The device information acquisition unit 201 primarily includes the control unit 31, searches for connected usable printers 3, and acquires device information from each of the found (detected) printers 3. The device information acquisition unit 201 looks for network-connected printers 3 using SNMP (Simple Network Management Protocol), for example, and acquires the device information from the Management Information Base (MIB) of the connected printer 3.

The device list generation unit 202 has the control unit 31 as a main part, and generates and stores a device list 36 (list of usable printers 3) in the storage unit 32 based on the device information acquired by the device information acquisition unit 201. The device list transmission unit 203 primarily includes the control unit 31, communication unit 33, and HTTP server 35, and when a request for the device list 36 is received from the client terminal 2, responds by sending the device list 36 stored in the storage unit 32. The print data transmission unit 204 primarily includes the control unit 31, communication unit 33, board interface 34 and HTTP server 35, receives the output printer information and print data described below from the client terminal 2, and sends the print data to the printer 3 specified by the output printer information. The print data transmission unit 204 also receives and sends the printing process result from the printer 3 to the client terminal 2.

The client terminal 2 includes a web page acquisition unit 71, drawing process unit 72, device list acquisition unit 211, printer selection unit 212 (device selection unit), print settings unit 213, print data generation unit 73, print command unit 214, and device state transmission unit 215.

The device list acquisition unit 211 primarily includes the control unit 51 and print control script 23, sends a device list 36 request to the interface board 4 according to the print control script 23, and in response receives the device list 36 from the interface board 4.

The printer selection unit 212 primarily includes the control unit 51 and print control script 23, displays a printer selection window for selecting one printer 3 from the acquired device list 36, and sets the printer 3 selected by the user as the print data destination. Note that the acquired device list 36 and the information for the printer 3 set as the destination may be stored in a cookie by the web browser 56 or in a web storage device so that the stored data can be read and reset the next time.

The print settings unit 213 primarily includes the control unit 51 and print control script 23, and displays a device information configuration window for displaying and setting the device information (basic device information and detailed device information) of the printer 3 selected with the printer selection unit 212. This device information configuration window is displayed when, for example, a certain button (such as a properties button) in the printer selection window is operated, and displays the optional device information and consumables information of the printer 3, and enables configuring printer settings such as the paper size, number of copies, print quality, color/Bw printing, and the image processing method. The print settings unit 213 also stores the settings changed by the user in a cookie of the web browser 56 or on a web storage device so that the stored print settings can be read and the print settings can be reset the next time printing is done.

The print command unit 214 primarily includes the control unit 51, communication unit 55, and print control script 23, and sends the device information (information for the destination printer (printer ID and communication port)) for the output printer 3 selected by the printer selection unit 212, and the print data temporarily stored by the print data generation unit 73, to the interface board 4. Note that the print command unit 214 stops transmission if the web page 21 changes while the print data is being sent.

The device state transmission unit 215 primarily includes the control unit 51 and print control script 23, receives the results of printing processes from the printer 3 through the interface board 4, and sends device information (printer ID, printer name, communication port and printer 3 status) updated according to the printing process results to the device management server 5.

The printer 3 has a print data receiving unit 221, print control unit 82 and print result transmission unit 222. The print data receiving unit 221 primarily includes the control unit 41, communication unit 44, and printer interface 45, and receives print data sent from the client terminal 2 through the interface board 4. The print result transmission unit 222 sends the printer 3 status, such as whether the printing process ended normally (printing completed) or whether the printing process failed (error occurred), through the interface board 4 to the client terminal 2.

The device management server 5 has a device state reception unit 231 and device state reporting unit 232. The device state reception unit 231 primarily includes the control unit 61, communication unit 63, and HTTP server 65, and receives device information (printer ID, printer name, communication port and printer 3 status) for each printer 3 from the client terminal 2. The device state reporting unit 232 primarily includes the the control unit 61, display unit 64, and device management application 66, and displays the status of each printer 3 in a window of the device management application 66 based on the received device information.

The printing process in this network system SY2 is described next with reference to the flow chart in FIG. 8. Note that the device list 36 is generated and stored by a process of the device information acquisition unit 201 (device information acquisition step) and a process of the device list generation unit 202 (device list generation step). In addition, because S31 to S33 and S39 to S42 in FIG. 8 are identical to S01 to S03 and S04 to S07 in FIG. 3 of the first embodiment, detailed description thereof is omitted below.

When the client terminal 2 receives the start printing command in S33, this triggers the print control script 23 being called from the page control script 22, and the printing process starts. More specifically, the client terminal 2 requests the device list 36 from the interface board 4 according to the print control script 23 (S34). When this request is received, the interface board 4 returns the device list 36 stored in the storage unit 32 to the client terminal 2 in response (S35, device list transmission step).

When the client terminal 2 then acquires the device list 36 from the interface board 4 (S36, device list acquisition step), the client terminal 2 displays the printer selection window for selecting the output printer 3 based thereon (S37). When the user then selects and verifies one printer 3 from the printer selection window, the client terminal 2 sets the selected printer 3 as the output destination of the print data (S38, device list selection step).

The client terminal 2 then generates and stores the print data by means of the print control script 23 (S39-S42, drawing process step, print data generation step), and after generating the print data is completed (S42; Yes), sends the information about the printer 3 set as the destination and the print data stored in the storage unit 52 to the interface board 4 (service endpoint address of the interface board 4) according to the print control script 23 (S43, printing instruction step).

When the output printer information and print data is received from the client terminal 2 (S44), the interface board 4 sends the print data to the printer 3 specified by the output printer information (S45).

The printer 3 stores the print data received from the interface board 4 (S46) in the storage unit 42 (S47). These steps S46 and S47 repeat until all print data has been received (S48 returns No). When receiving all print data is completed (S48 returns Yes), the printer 3 reads the stored print data and prints (prints an image) based thereon (S49).

When the printing process ends, the printer 3 sends the result (printing process result: printing completed/error occurred) through the interface board 4 to the client terminal 2 (S50, S51). Next, when the printing process result is received from the printer 3 (interface board 4), (S52), the client terminal 2 sends device information reflecting the result to the device management server 5 (S53). The client terminal 2 may also display the printing process result on its own display unit 53 (or in the web browser 56). When device information is then received from the client terminal 2 (S54), the device management server 5 displays (updates) the printer 3 status in a window of the device management application 66 based on the received device information (S55).

When a plurality of printers 3 are connected as described in the second embodiment above, the device list 36 (a list of usable printers 3) is acquired according to the print control script 23 embedded in the web page 21, the output printer 3 is selected (specified) from the device list 36, and the desired image can be printed. More specifically, the printer 3 can be selected and a printing process can be executed by simply installing a web browser 56 on the client terminal 2, without installing a printer driver on each client terminal 2 as in the related art.

Note that the interface board 4 finds the usable printers 3 and generates the device list 36 in the second embodiment, but the invention is not so limited. For example, the interface board 4 could provide a printer registration function for manually registering printers 3, and the user could use this printer registration function from the web browser 56 (client terminal 2) to generate the device list 36 by inputting, for example, the printer ID, printer name, and board information for the target printer 3.

Example 3

A network system SY3 according to a third embodiment of the invention is described next with reference to FIG. 9 to FIG. 11. The network system SY3 according to the third embodiment of the invention differs from the network system SY2 according to the second embodiment of the invention in that authentication of users that use the printer 3, and managing a list of usable printers 3 (device list 36), are managed by the web application server 1; and only users that are allowed by authentication by the web application server 1 can select a printer 3 based on the device list 36 and print. Other aspects of this embodiment are the same as in the network system SY2 according to the second embodiment of the invention. Note that like parts in the first and second embodiments are identified by the same reference numerals in the third embodiment, and further detailed description thereof is omitted. In addition, variations of like parts that are applicable to the first and second embodiments are similarly applicable to this embodiment. The differences in particular are described below.

FIG. 9 shows the configuration of the network system SY3. The web application server 1 includes, in addition to a control unit 11, storage unit 12 (device list storage unit, user information storage unit), and communication unit 13, other hardware components of a typical computer. The storage unit 12 stores, in addition to a HTTP server 14 and web application 15, a device list 36 and user database 17. The device list 36 is a list of usable printers 3, and includes at least the printer ID, printer name, and communication port to which the printer 3 is connected as device information. Note that this device information is simply an example, and the invention is not limited thereto. The user database 17 is a database for administering information ("user information" below) about a user that is permitted to use the web application 15, and contains a user ID for identifying the user and a related password.

The communication unit 13 is an interface for communicating (HTTP communication) with the client terminal 2 (web browser 56). When the client terminal 2 accesses (HTTP request) the web application 15, the web application server 1 authenticates the login based on information input from the client terminal 2 (referred to below as the user identification information (identification information)), and permits access to the web application 15 and sends the desired web page 21 (including page control script 22 and print control script 23) only when authentication is successful. The web application server 1 sends the device list 36 of usable printers 3 to the permitted client terminal 2 (user).

The client terminal 2 primarily includes the control unit 51, storage unit 52, display unit 53, operating unit 54, and communication unit 55. The operating unit 54 is an operating means for inputting user identification information (user ID and password) in addition to performing input operations (such as inputting text and drawing figures), and making selection/decision operations and printing operations, in a web page 21 displayed by the web browser 56.

The communication unit 55 is an interface for communicating with the web application server 1 and interface board 4, and the client terminal 2 communicates with other devices using the web browser 56. The client terminal 2 (control unit 51) uses the web browser 56 to access the web application server 1 and get the web page 21 provided by the web application 15. To get the web page 21, the client terminal 2 first sends the user identification information input by the user to the web application 15 (web application server 1) in order to login to the web application 15. After the login is authenticated based on the user identification information by the web application 15, that is, after access to the web application 15 is permitted, the desired web page 21 is received.

When the user performs a print operation on the web page 21, the client terminal 2 runs the print control script 23 embedded in the web page 21, gets the device list 36 from the web application server 1, and displays a printer selection window (in this third embodiment, a window for selecting one of printers 3A to 3C) for selecting the output printer 3 based thereon. When the user then selects the desired printer 3 from the list in the printer selection window and issues a print command, the client terminal 2 converts the image data written in the drawing area and generates print data, and sends the print data and the device information (printer ID and communication port) for the selected printer 3 to the interface board 4 (the service endpoint).

The functional configuration of the network system SY3 is described next with reference to FIG. 10. The web application server 1 includes a user identification information reception unit 301, user authentication unit 302, and device list transmission unit 303. The user identification information reception unit 301 mainly includes the control unit 11, HTTP server 14 and web application 15, and receives user identification information (user ID and password) sent from the client terminal 2.

The user authentication unit 302 mainly includes the control unit 11, web application 15 and user database 17, and authenticates the user (authenticates login) when the user accesses the web application 15 using the client terminal 2 (web browser 56). More specifically, the user authentication unit 302 determines if the user identification information received by the user identification information reception unit 301 is registered in the user database 17. If the received user identification information is registered in the user database 17 (authentication succeeds), use of the web application 15 by the user (login to the web application 15) is permitted; if not registered in the user database 17 (authentication fails), use of the web application 15 by the user (login to the web application 15) is rejected, and the client terminal 2 is prompted for re-input of the user identification information.

The device list transmission unit 303 includes as main parts the control unit 11 and HTTP server 14, and when a device list 36 request is received from the client terminal 2, sends the device list 36 stored in the storage unit 12 in response.

The client terminal 2 includes a log-in window display unit 311 (identification information input window display unit), user identification information input unit 312, user identification information transmission unit 313 (identification information transmission unit), web page acquisition unit 314, drawing process unit 72, device list acquisition unit 315, printer selection unit 212 (device selection unit), print data generation unit 73, and print command unit 214.

The log-in window display unit 311 includes as main parts the control unit 51, display unit 53 and web browser 56, and displays a login window (identification information input window) for inputting user identification information to login to the web application 15 on the web browser 56. The user identification information input unit 312 includes as main parts the control unit 51, operating unit 54 and web browser 56, and inputs the user identification information based on user operations in the login window. The user identification information transmission unit 313 includes as main parts the control unit 51 and web browser 56, and sends the user identification information input by the user identification information input unit 312 to the web application server 1 (web application 15).

The web page acquisition unit 314 includes as main parts the control unit 51 and web browser 56, when login is authenticated by the web application server 1, acquires the desired web page 21 (including page control script 22 and print control script 23) from the web application server 1 (web application 15) by the web browser 56.

The device list acquisition unit 315 includes as main parts the control unit 51 and print control script 23, sends a request for the device list 36 to the web application server 1 by means of the web application server 1, and gets the device list 36 from the web application server 1 in response.

The interface board 4 has a print data relay unit 321. The print data relay unit 321 includes as main units the control unit 31 and HTTP server 35, receives the output printer information and print data from the client terminal 2, and sends print data to the printer 3 specified by the output printer information.

The user authentication process and printing process of the network system SY3 are described next with reference to the flow chart in FIG. 11. Note that steps S75 to S85 in FIG. 11 are the same as steps S39 to S49 in FIG. 8 according to the second embodiment of the invention, and further description thereof is therefore omitted below.

First, the client terminal 2 (control unit 51) accesses the web application server 1 (web application 15) based on user operations in the web browser 56, and displays a login window for logging into the web application 15 on the web browser 56 (S61, identification information input window display step). User identification information (user ID and password) is then input (S62) by the user inputting data to the login window, and the client terminal 2 sends the input user identification information to the web application server 1 (S63, identification information transmission step).

When the web application server 1 (control unit 11) receives user identification information from the client terminal 2 (S64, identification information reception step), the web application server 1 applies an authentication process to the received user identification information (S65, user authentication step). More specifically, the web application server 1 determines if the received user identification information is registered in the user database 17. If the user identification information is not registered in the user database 17 (authentication fails; S66 returns No), the web application server 1 prompts the client terminal 2 for the user identification information to be input again, and the client terminal 2 repeats the process from S61. However, if the user identification information is registered in the user database 17 (authentication succeeds; S66 returns Yes), the web application server 1 allows the client terminal 2 to log into the web application 15.

The client terminal 2 that was permitted to log in then gets the desired web page 21 from the web application server 1 (web application 15) according to user operation of the web browser 56, and displays the web page 21 on the web browser 56 (S67, web page acquisition step, display step).

When the user then performs an input operation on the web page 21, the client terminal 2 receives the input operation according to the page control script 22 embedded on the web page 21, and writes the result of the received input operation in the drawing area (S68). If the user then performs a print operation on the web page 21 from this state (after writing), the client terminal 2 gets a start printing command in conjunction with the printing operation from the page control script 22 (S69). Triggered by receiving this start printing command, the print control script 23 is called from the page control script 22, and the printing process is started.

More specifically, the client terminal 2 requests the device list 36 from the web application server 1 by means of the print control script 23 (S70). When this request is received, the web application server 1 sends the device list 36 stored in the storage unit 12 to the client terminal 2 in response (S71). When the device list 36 is acquired from the web application server 1 (S72, device list acquisition step), the client terminal 2 (print control script 23) displays the printer selection window for selecting the output printer 3 (S73). When the user then selects and confirms one printer 3 in the printer selection window, the client terminal 2 sets the selected printer 3 as the output destination for the print data (S74, device selection step).

Next, the client terminal 2 generates and saves the print data according to the print control script 23 (S75-S78, drawing process step, print data generation step), and after generating the print data is completed (S78; Yes), sends the information for the printer 3 set as the output printer (output printer information) and the saved print data to the interface board 4 (S79, printing instruction step). The interface board 4 (control unit 31) then sends the print data to the printer 3 identified by the output printer information received from the client terminal 2 (S80, S81). The printer 3 (control unit 41) then prints based on the print data after all print data is received from the interface board 4 (S82-S85).

When plural printers are connected as described in this third embodiment above, user authentication is performed by the web application server 1, and only users for which authentication was allowed (authentication succeeded) can select a printer 3 from the device list 36 (printer list) acquired by the print control script 23 embedded in the web page 21 and print the desired image. More specifically, having a web browser 56 that displays (acquires) a web page 21 installed on the client terminal 2 is sufficient to authenticate the user of the printer 3 and enable only permitted users to select a usable printer 3 and print, and installing a printer driver on each client terminal 2 as in the related art is not necessary.

Example 4

A network system SY4 according to a fourth embodiment of the invention is described next with reference to FIG. 12 to FIG. 14. The network system SY4 according to the fourth embodiment of the invention differs from the network system SY3 according to the third embodiment of the invention in that authentication of users of the printer 3 is handled on the interface board 4 side. More specifically, this embodiment differs in that the interface board 4 has a authentication processor 401 and user database 402, and the authentication processor 401 authenticates the user identification information (information that identifies the user: user ID and password, identification information) received from the client terminal 2, and permits use of the printer 3 (print images from the printer 3) when authentication is successful. Other aspects of this embodiment are the same as in the network system SY3 according to the third embodiment of the invention. Note that like parts in the first to third embodiments are identified by the same reference numerals in the fourth embodiment, and further detailed description thereof is omitted. In addition, variations of like parts that are applicable to the first to third embodiments are similarly applicable to this embodiment. The differences in particular are described below.

As shown in FIG. 12, the interface board 4 of the network system SY4 according to the fourth embodiment of the invention also has an authentication processor 401 and user database 402 (user information storage unit). The user database 402 is a database for managing users that are permitted to use the printer 3, and stores a user ID and password (user information) for identifying a user linked to the printer ID of the printer 3 the user can use and the communication port to which the printer 3 is connected (the ID and communication port of the printer 3 allowed to be used by the user identified by the user ID, collectively referred to below as the printer information (printer identification information)). The authentication processor 401 authenticates printer 3 users based on the user identification information received from the client terminal 2 and the user database 402.

The functional configuration of the network system SY4 is described next with reference to the function block diagram in FIG. 13. The client terminal 2 has a web page acquisition unit 71, drawing process unit 72, user identification information input window display unit 411 (identification information input window display unit), user identification information input unit 412, print data generation unit 73, and print command unit 413.

The user identification information input window display unit 411 includes as main parts a control unit 51, display unit 53, print control script 23 and web browser 56, and by means of the print control script 23 displays on the web browser 56 a user identification information input window (identification information input window) for inputting user identification information (user ID and password) used for authentication when a user uses the printer 3. The user identification information input unit 412 includes as main parts a control unit 51, operating unit 54 and web browser 56, and inputs user identification information based on input operations by the user in the user identification information input window. The print command unit 413 includes as main parts the control unit 51 and print control script 23, and outputs the user identification information input by the user identification information input unit 412 related to the print data generated by the print data generation unit 73 to the interface board 4.

The interface board 4 has a data reception unit 421, user authentication unit 422, output printer setting unit 423, and print data relay unit 424. The data reception unit 421 includes the control unit 31 and HTTP server 35 as main parts, and receives user identification information and print data from the client terminal 2 (print command unit 413).

The user authentication unit 422 includes as main parts the control unit 31, authentication processor 401 and user database 402, and performs authentication of users using the printer 3. More specifically, the user authentication unit 422 compares the received user identification information and the user information registered in the user database 402, determines that authentication succeeded if the user identification information matches user information registered in the user database 402, and determines that authentication of the user identification information (user) failed if there is no matching user information.

The output printer setting unit 423 includes as main parts the control unit 31 and authentication processor 401, and sets the printer 3 used for printing based on the result of authentication by the user authentication unit 422. More specifically, when authentication by the user authentication unit 422 is successful, the printer 3 identified by the printer information (printer ID and communication port) linked to the user information matching the user identification information is set as the output printer. If authentication failed, a message indicating that printer 3 access is not allowed is sent to the client terminal 2 (user). The print data transmission unit 424 includes mainly the control unit 31, and sends print data to the printer 3 set as the output printer by the output printer setting unit 423.

The user authentication process and printing process of the network system SY4 according to the fourth embodiment of the invention is described next with reference to the flow chart in FIG. 14. Note that steps S91-S93, S96-S99 and S107-S110 in FIG. 14 are identical to steps S31-S33, S39-S42 and S46-S49 in FIG. 8 according to the second embodiment of the invention, and detailed description thereof is therefore omitted.

When the client terminal 2 receives a start printing command in S93, the print control script 23 of the client terminal 2 displays a user identification information input window (S94, identification information input window display step), and the user identification information (user ID and password) is input (S95) as a result of user input to the input window. The input user identification information is then stored in a web browser 56 cookie or web storage device (stored in storage unit 52), for example.

The client terminal 2 then generates and saves print data by means of the print control script 23 (S96-S99, drawing process step, print data generation step), and after generating the print data is completed (S99 returns Yes), the input user identification information and print data are sent together to the interface board 4 (S100, printing instruction step).

When the user identification information and print data are received from the client terminal 2 (S101, data reception step), the interface board 4 (control unit 31) applies the authentication process to the received user identification information (S102, user authentication step). More specifically, whether the received user identification information is registered in the user database 402 is determined. If the user identification information is not in the user database 402 (authentication fails; S103 returns No), the interface board 4 sends a warning message to the client terminal 2 indicating that the printer 3 cannot be used because user authentication failed (that is, that the user cannot print from the printer 3) (S104).

If the user identification information is registered in the user database 402 (authentication succeeds; S103 returns Yes), the interface board 4 extracts printer information (printer ID and communication port) linked to the user information matching the user identification information, and sets the printer 3 specified by the printer information as the output printer 3 (S105, output printer setting step). The interface board 4 then sends the print data to the printer 3 set as the output printer (S106, print data relay step). The printer 3 (control unit 41) then prints based on the print data after all print data is received from the interface board 4 (S107-S110).

When plural printers 3 are connected as described in this fourth embodiment above, user identification information (user information) for identifying the user is input using the print control script 23 embedded on a web page 21, and authentication based on the input user identification information is successful, the user can print from a printer 3 linked to the user. More specifically, having a web browser 56 that displays (acquires) a web page 21 installed on the client terminal 2 is sufficient to enable printing and limit what users can use the printer 3 without installing a printer driver on each client terminal 2 as in the related art.

Example 5

A network system SY5 according to a fifth embodiment of the invention is described next with reference to FIG. 15 to FIG. 17. In the network system SY5 according to the fifth embodiment of the invention, the web application server 1 authenticates the printer 3 by an authentication process that uses an encryption key (secret key), and enables image printing from a permitted printer 3. More specifically, the printer 3 that can be used for printing is limited by printer 3 authentication. As shown in the system diagram in FIG. 15, the network system SY5 according to the fifth embodiment of the invention differs from the network system SY3 according to the third embodiment of the invention in that the web application server 1 has an authentication processor 501, and the interface board 4 has an encryption processor 502 and printer management database 503. Other aspects of this embodiment are the same as in the third embodiment of the invention. Note that like parts in the first to fourth embodiments are identified by the same reference numerals in the fifth embodiment, and further detailed description thereof is omitted. In addition, variations of like parts that are applicable to the first to fourth embodiments are similarly applicable to this embodiment. The differences in particular are described below.

As shown in FIG. 15, the web application server 1 of the network system SY5 according to the fifth embodiment of the invention has an authentication processor 501. The authentication processor 501 authenticates the printer 3 with the interface board 4 using a challenge and response authentication method. More specifically, the authentication processor 501 authenticates the printer 3 by sending authentication request information (a random numeric string that differs with each authentication) used for printer 3 authentication to the interface board 4 through the client terminal 2 (print control script 23), and comparing the authentication response information received from the interface board 4 as a response to the authentication request information with the result of encrypting the authentication request information (the authentication request information that was sent) using a previously stored encryption key (server encryption key, not shown).

The interface board 4 has an encryption processor 502 and printer management database 503 (printer management information storage unit). The printer management database 503 is a database for managing printers 3 connected to the interface board 4, and stores the printer ID and communication port (printer identification information) for each printer 3 (for each of printers 3A to 3C in this fifth embodiment) with a related encryption key (printer encryption key) that is different for each printer 3. The encryption processor 502 encrypts the authentication request information received from the web application server 1 using the printer encryption key of each printer 3 registered in the printer management database 503, and sends the encrypted information (encrypted authentication information) and the printer ID and communication port linked to the printer encryption key used for encryption (together referred to as the "authentication response information" below) through the client terminal 2 (print control script 23) to the web application server 1.

The functional configuration of the network system SY5 is described next with reference to the function block diagram in FIG. 16. The web application server 1 has an authentication request information transmission unit 511, authentication response information reception unit 512, printer authentication unit 513 and authentication result transmission unit 514. The authentication request information transmission unit 511 has a main parts the control unit 11, authentication processor 501 and HTTP server 14, and sends authentication request information to the interface board 4 (through the client terminal 2 (print control script 23)). Note that this transmission process starts when a request to execute the authentication process is received from the client terminal 2 (the authentication process request unit 521 described below).

The authentication response information reception unit 512 includes as main parts the control unit 11, authentication processor 501 and HTTP server 14, and receives authentication response information (encrypted authentication information, printer ID and communication port) from the interface board 4 (through the client terminal 2 (print control script 23)) as a response to the authentication request information sent from the authentication request information transmission unit 511. The printer authentication unit 513 has as main parts the control unit 11 and authentication processor 501, and authenticates the printer 3 by comparing the encrypted authentication information contained in the authentication response information received by the authentication response information reception unit 512 with the result of encrypting the authentication request information sent by the authentication request information transmission unit 511 using the server encryption key. If the encrypted authentication information and the result of the encryption operation match, authentication is determined to have succeeded, and authentication is determined to have failed if there is no match.

The authentication result transmission unit 514 includes as main parts the control unit 11, authentication processor 501 and HTTP server 14, and sends the authentication result from the printer authentication unit 513 to the client terminal 2. If the authentication result is that authentication succeeded, the printer ID and communication port information that was received with the encrypted authentication information for which authentication succeeded is sent to the client terminal 2. If authentication failed, a warning message to that effect is sent to the client terminal 2. Note that this fifth embodiment also sends a warning message when authentication fails for all printers 3 (printers 3A to 3C).

The client terminal 2 includes a web page acquisition unit 71, drawing process unit 72, authentication process request unit 521, authentication request information relay unit 522, authentication request information relay unit 522, authentication response information relay unit 523, authentication result reception unit 524, print data generation unit 73, and print command unit 525.

The authentication process request unit 521 includes as main parts the control unit 51 and print control script 23, and by means of the print control script 23 requests the web application server 1 to run the printer 3 authentication process. The authentication request information relay unit 522 includes as main parts the control unit 51 and print control script 23, and receives and relays authentication request information from the web application server 1 to the interface board 4 according to the print control script 23. The authentication response information relay unit 523 includes as main parts the control unit 51 and print control script 23, and receives and relays authentication response information from the interface board 4 to the web application server 1 by means of the print control script 23.

The authentication result reception unit 524 includes as main parts the control unit 51 and print control script 23, and receives the authentication result from the web application server 1 by means of the print control script 23. If the received authentication result indicates an authentication success, the printer ID and communication port received with the authentication result are set as the information for the output printer 3 (output printer information). If the received authentication result was that authentication failed, the warning message received with the authentication result is displayed on the web browser 56. The print command unit 525 includes as main parts the control unit 51 and print control script 23, and sends the output printer information (information for the successfully authenticated printer 3) set by the authentication result reception unit 524 linked to the print data generated by the print data generation unit 73 to the interface board 4.

The interface board 4 includes an authentication request information reception unit 531, encryption processor 532, authentication response information transmission unit 533 and print data relay unit 534. The authentication request information reception unit 531 includes as main parts the control unit 31, encryption processor 502 and HTTP server 35, and receives authentication request information from the web application server 1 (through the (client terminal 2 (print control script 23)). The encryption processor 532 includes as main parts the control unit 31 and encryption processor 502, encrypts the received authentication request information using the printer encryption key related to each printer 3 registered in the printer management database 503, and generates encrypted authentication information for each printer 3.

The authentication response information transmission unit 533 includes as main parts the control unit 31, encryption processor 502 and HTTP server 35, and sends the encrypted authentication information produced by the encryption processor 532, and information about the printer ID and communication port linked to the printer encryption key used to produce the encrypted authentication information, as the authentication response information to the web application server 1 (through the (client terminal 2 (print control script 23)). The print data relay unit 534 includes as main parts the control unit 31, receives the output printer information and print data from the client terminal 2 (print command unit 525), and sends the print data to the printer 3 specified by the received output printer information.

The printer authentication process and printing process of the network system SY5 according to the fifth embodiment of the invention are described next with reference to FIG. 17. Note that steps S121-S123, S138-S148 in FIG. 17 are the same as steps S31-S33, S39-S49 in FIG. 8 according to the third embodiment of the invention, and detailed description thereof is therefore omitted.

When the client terminal 2 receives a start printing command in S123, the client terminal 2 sends an authentication process request for the printer 3 to the web application server 1 by means of the print control script 23 (S124). When the authentication process request is received, the web application server 1 (control unit 11) generates authentication request information (a random numeric string) and sends the resulting authentication request information to the client terminal 2 (S125), and the print control script 23 of the client terminal 2 then relays (sends) the received authentication request information to the interface board 4 (S126).

When the interface board 4 (control unit 31) receives the authentication request information from the client terminal 2 (S127, authentication request information reception step), the interface board 4 applies the encryption process to the authentication request information (S128). This encryption process encrypts the authentication request information using the printer encryption key for each printer 3 registered in the printer management database 503, and generates encrypted authentication information. This fifth embodiment encrypts the authentication request information using the printer encryption keys respectively related to the three printers 3A to 3C. More specifically, three sets of encrypted authentication information are created using the three different printer encryption keys.

Next, the interface board 4 sends the resulting encrypted authentication information and the printer ID and communication port information (authentication response information) related to the printer encryption keys used to encrypt the encrypted authentication information to the client terminal 2 (S129, authentication response information transmission step), and the client terminal 2 sends (relays) the received authentication response information to the web application server 1 according to the print control script 23 (S130). More specifically, this fifth embodiment of the invention sends authentication response information for printer 3A, authentication response information for printer 3B, and authentication response information for printer 3C from the interface board 4 to the web application server 1.

When the authentication response information is received (S131), the web application server 1 applies the authentication process to the authentication response information received for each printer (S132, printer authentication step). This authentication process first encrypts the authentication request information sent to the interface board 4 using the locally stored server encryption key. Next, the result of encryption using the server encryption key is compared with the encrypted authentication information contained in the received authentication response information, authentication succeeds if they match, and authentication fails if they do not match. After the authentication process ends, the web application server 1 sends the authentication result (result of comparison) to the client terminal 2 (S133, authentication result transmission step). The printer ID and communication port information linked to the encrypted authentication information for which authentication succeeded is also sent at this time if authentication succeeded. If authentication fails in all authentication processes (authentication of printers 3A, 3B and 3C), a warning message indicating there is not a printer 3 for which use is allowed is sent.

The client terminal 2 then receives the authentication result from the web application server 1 by means of the print control script 23 (S134). If the received authentication result is that authentication failed (S135 returns No), the client terminal 2 displays the received warning message on the web browser 56 (S136). If the received authentication result is information that authentication was successful (S135 returns Yes), the client terminal 2 sets the received printer ID and communication port as the information for the output printer 3 (output printer information) (S137).

Next, the client terminal 2 generates and saves the print data by means of the print control script 23 (S138-S141, drawing process step, print data generation step), and after print data generation is completed (S141 returns Yes), sends the output printer information set in S137 and the print data saved in the storage unit 52 to the interface board 4 according to the print control script 23 (S142, printing instruction step).

The interface board 4 sends the print data to the printer 3 specified by the output printer information received from the client terminal 2 (S143, S144). The printer 3 (control unit 41) then prints based on the print data after all print data is received from the interface board 4 (S145-S148).

As described above, when plural printers 3 are connected and printing is performed according to a print control script 23 embedded in a web page 21, this fifth embodiment of the invention authenticates the connected printers 3, and enables printing only from a printer 3 for which authentication is successful (authentication is allowed). More specifically, having a web browser 56 that displays (acquires) a web page 21 installed on the client terminal 2 is sufficient to restrict the printer 3 that can be used for output, and installing a printer driver on each client terminal 2 as in the related art is not necessary.

Note that the units (functions) of the interface board 4 in the second to fifth embodiments described above could be rendered by a common personal computer (device server). Alternatively, these functions could be incorporated in one (such as printer 3A) of the plural printers 3 described above. These units could also be built into each of the printers 3.

In the first to fifth embodiments described above, the client terminal 2 generates print data from the image data in a drawing area, and sends this print data to the printer 3, but the image data could be segmented into data blocks of a size that can be sent in a single transmission, and the print data (segmented print data) could be generated and transmitted separately for each image data block. More specifically, the print data can be segmented and transmitted in data blocks of a size that can be transmitted in a single data transmission. As a result, deletion of the print control script 23 and interruption of print data transmission at some indeterminate point when sending a large amount of print data as a result of the web page 21 changing during print data transmission can be prevented.

Note, further, that elements of the network systems SY1 to SY5 above can be provided as a program. The program can also be provided stored on a storage medium (not shown). Examples of such recording media include CD-ROM, flash ROM, memory cards (including Compact-Flash®, smart media, and memory sticks), Compact Discs, magneto-optical discs, digital versatile discs, and floppy disks.

The invention is also not limited to the foregoing embodiments, and the components and processes of the network systems SY1 to SY5 described above can be desirably varied without departing from the scope of the invention.

INDUSTRIAL APPLICABILITY

As described above, the invention is useful as a network system, interface board, printing control method for a network system, and a program, and is particularly suited to controlling a printer without requiring a printer driver that depends on the computer environment.

REFERENCE SIGNS LIST 1 web application server
2 client terminal
3 printer
3A printer
3B printer 3C printer
4 interface board
5 device management server
15 web application
17 user database
402 user database
21 web page
22 page control script
23 print control script
36 device list
53 display unit
56 web browser
71 web page acquisition unit
314 web page acquisition unit
72 drawing process unit
73 print data generation unit
74 print command unit
214 print command unit
413 print command unit
525 print command unit
76 print settings unit
213 print settings unit
81 print data reception unit
221 print data reception unit
82 print control unit
201 device information acquisition unit
202 device list generation unit
203 device list transmission unit
211 device list acquisition unit
315 device list acquisition unit
212 printer selection unit
215 device state transmission unit
231 device state reception unit
232 device state reporting unit
301 user identification information reception unit
302 user authentication unit
311 log-in screen display unit
313 user identification information transmission unit
411 user identification information input screen display unit
422 user authentication unit
423 output printer setting unit
424 print data relay unit
503 printer management database
513 printer authentication unit
514 authentication result transmission unit
531 authentication request reception unit
533 vertical response transmission unit
SY1 network system
SY2 network system
SY3 network system
SY4 network system
SY5 network system

The invention claimed is:

1. A printer comprising:
a communication interface configured to receive data blocks of print data from a client terminal in a single data transmission;
a memory configured to temporarily store the data blocks of the print data; and
a controller configured to
determine whether the data blocks are received,
in response to determination that the data blocks are received, read the print data from the memory and print the print data, and
provide a print setting service to the client terminal for configuring printing as a user interface using a web service application programming interface.

2. The printer of claim 1, wherein
the communication interface is further configured to start receiving the print data when the data blocks of the print data are generated by the client terminal.

3. The printer of claim 2, wherein
the controller is further configured to decide whether the data blocks of the print data are received whenever the communication interface receives the print data.

4. The printer of claim 1, wherein
the memory is configured to store an HTTP server,
the communication interface is further configured to receive the print data when the print data is sent from the client terminal to a service endpoint address assigned to the printer using HTTP by the HTTP server.

5. The printer of claim 4, further comprising:
a print setting service provider, including the HTTP server, configured to provide a print setting service to the client terminal,
wherein the print setting service is provided as the user interface using the web service application programming interface.

6. The printer of claim 5, wherein
the print setting service includes one or more service among setting a paper size, number of copies, print quality, color printing or black and white printing, and an image processing method.

7. A method of controlling a printer comprising:
generating print data by a print control script embedded in a web page displayed in a client terminal;
sending, by the print control script embedded in the web page, the generated print data to the printer;
receiving, by the printer, the print data from the client terminal;
temporarily storing, by the printer, the print data into a memory;
determining that the data receiving step receives all of the print data;
in response to the determination, reading the print data from the memory and printing the print data; and
providing a print setting service to the client terminal for configuring printing as a user interface using a web service application programming interface.

8. The method of claim 7, further comprising:
receiving the web page using a web browser of the client terminal from a web application server on which a web application operates.

9. The method of claim 7, wherein
the receiving the print data includes receiving the print data when all the print data are generated by the client terminal.

10. A printer configured to be connectable to a client terminal, the printer comprising:
a memory configured to temporarily store print data that is acquired from the client terminal and has been generated by executing a print control script embedded in a web page; and
a controller configured to:
receive the print data from the client terminal,
read, when all of the print data are received, the print data from the memory,
print the print data, and
provide a print setting service to the client terminal for configuring printing as a user interface using a web service application programming interface.

11. The printer of claim 10, wherein
the controller is further configured to process an image command in the print data.

* * * * *